US012059890B2

(12) United States Patent
Hirabayashi

(10) Patent No.: US 12,059,890 B2
(45) Date of Patent: Aug. 13, 2024

(54) LIQUID DISCHARGE APPARATUS AND METHOD OF DISCHARGING LIQUID

(71) Applicant: Shinichiroh Hirabayashi, Kanagawa (JP)

(72) Inventor: Shinichiroh Hirabayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 107 days.

(21) Appl. No.: 17/982,503

(22) Filed: Nov. 7, 2022

(65) Prior Publication Data

US 2023/0158814 A1 May 25, 2023

(30) Foreign Application Priority Data

Nov. 19, 2021 (JP) ................................ 2021-188777
Sep. 6, 2022 (JP) ................................ 2022-141249

(51) Int. Cl.
*B41J 11/42* (2006.01)
*B41J 2/21* (2006.01)
*B41J 11/00* (2006.01)
*B41J 25/00* (2006.01)

(52) U.S. Cl.
CPC ............ *B41J 11/42* (2013.01); *B41J 11/0095* (2013.01); *B41J 2/2146* (2013.01); *B41J 25/001* (2013.01)

(58) Field of Classification Search
CPC ...... B41J 11/42; B41J 11/0095; B41J 2/2146; B41J 25/001
See application file for complete search history.

(56) References Cited

U.S. PATENT DOCUMENTS 10,427,423 B2 * 10/2019 Nagasu .................. B41J 25/001

FOREIGN PATENT DOCUMENTS

JP 2006-142632 6/2006
JP 2018-020557 2/2018

* cited by examiner

*Primary Examiner* — Geoffrey S Mruk
(74) *Attorney, Agent, or Firm* — Duft & Bornsen, PC

(57) ABSTRACT

A liquid discharge apparatus includes a conveyor, a discharger, a first mover, an output device, a second mover, and circuitry. The conveyor conveys an elongated web in a conveyance direction in a state in which tension is applied to the web. The discharger discharges liquid to the web conveyed by the conveyor. The first mover moves the discharger in a width direction intersecting the conveyance direction. The output device outputs position information of the web in the width direction. The second mover moves the output device in the width direction. The circuitry controls movement of the discharger based on the position information of the web. The circuitry controls movement of the output device based on information of a length of the web in the width direction and expansion-and-contraction range information of the web in the width direction to change a position of the output device in the width direction.

4 Claims, 17 Drawing Sheets

LIQUID DISCHARGE APPARATUS AND METHOD OF DISCHARGING LIQUID

CROSS-REFERENCE TO RELATED APPLICATIONS

This patent application is based on and claims priority pursuant to 35 U.S.C. § 119(a) to Japanese Patent Application Nos. 2021-188777, filed on Nov. 19, 2021, and 2022-141249, filed on Sep. 6, 2022, in the Japan Patent Office, the entire disclosure of which is hereby incorporated by reference herein.

BACKGROUND

Technical Field

Embodiments of the present disclosure relate to a liquid discharge apparatus and a method of discharging liquid.

Related Art

In the related art, a liquid discharge apparatus is known to discharge liquid to an elongated web conveyed along a conveyance direction.

For the above-described liquid discharge apparatus, a configuration is known to correct a position of a web. The liquid discharge apparatus detects a deviation amount of relative positions, in a width direction intersecting a conveyance direction, between a printing unit that discharges liquid and the web facing the printing unit. The liquid discharge apparatus moves the printing unit and the web according to a result of the detection.

SUMMARY

Embodiments of the present disclosure described herein provide a novel liquid discharge apparatus including a conveyor, a discharger, a first mover, an output device, a second mover, and circuitry. The conveyor conveys an elongated web in a conveyance direction in a state in which tension is applied to the web. The discharger discharges liquid to the web conveyed by the conveyor. The first mover moves the discharger in a width direction intersecting the conveyance direction. The output device outputs position information of the web in the width direction. The second mover moves the output device in the width direction. The circuitry controls movement of the discharger by the first mover based on the position information output by the output device. The circuitry controls movement of the output device by the second mover based on information of a length of the web in the width direction and expansion-and-contraction range information of the web in the width direction to change a position of the output device in the width direction.

Embodiments of the present disclosure described herein provide a novel method of discharging liquid to be executed by a liquid discharge apparatus. The method of discharging liquid includes conveying, discharging, moving, outputting, and controlling. The conveying conveys, by a conveyor, an elongated web in a conveyance direction in a state in which tension is applied to the web. The discharging discharges, by a discharger, liquid to the web conveyed by the conveyor. The moving moves, by a first mover, the discharger in a width direction intersecting the conveyance direction. The outputting outputs, by an output device, position information of the web in the width direction. The moving moves, by a second mover, the output device in the width direction. The controlling controls, by circuitry, movement of the discharger by the first mover based on the position information output by the output device. The controlling controls, by the circuitry, movement of the output device by the second mover based on information of a length of the web in the width direction and expansion-and-contraction range information of the web in the width direction and changing a position of the output device in the width direction.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
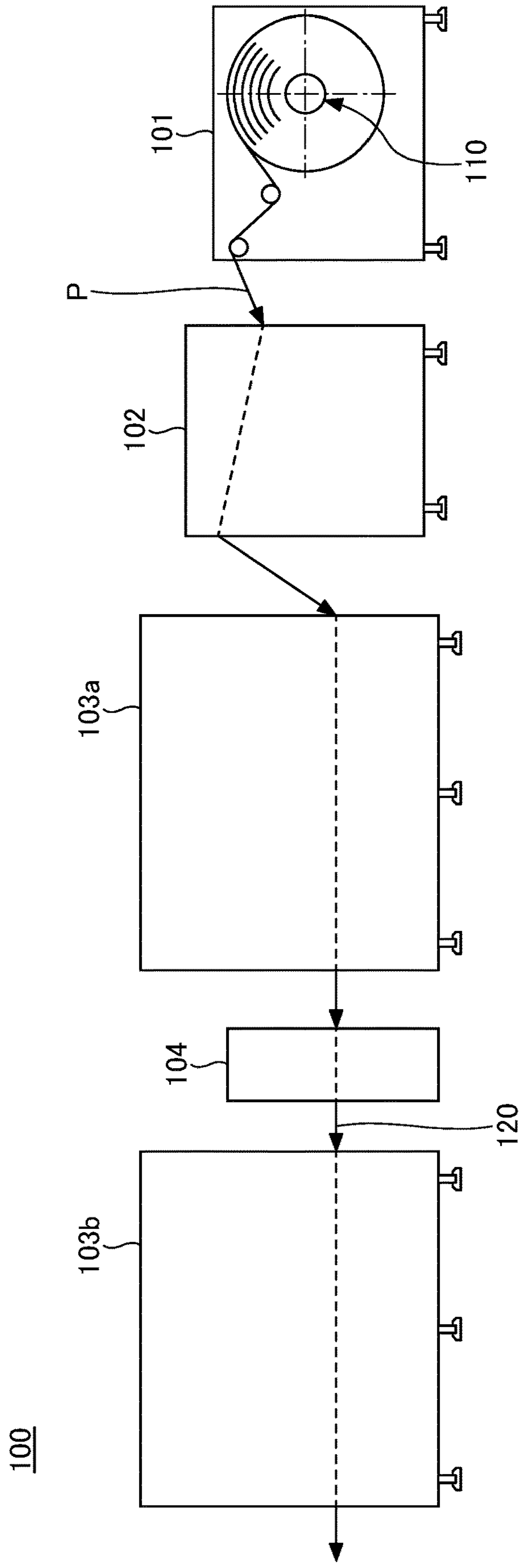
FIG. 1 is a diagram illustrating an overall configuration of a liquid discharge apparatus according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments of the present disclosure are described in detail with reference to the drawings. In the drawings, the same components are denoted by the same reference numerals, and redundant descriptions thereof are appropriately omitted below. Note that image formation, recording, and printing in the terms of the embodiments described below are synonymous.

EMBODIMENTS

Example of Overall Configuration of Liquid Discharge Apparatus 100

The liquid discharge apparatus 100 according to the present embodiment is a liquid discharge type image forming apparatus that discharges ink for image formation, which is an example of liquid, and applies the ink to a continuous sheet P, which is an example of an elongated web, to form an image on the continuous sheet P.

The elongated web refers to a long recording medium on which continuous printing can be performed. Examples of the "recording medium" include recording media such as sheet of paper, recording paper, recording sheet of paper, plain paper, glossy paper, and film. The continuous sheet P is a type of sheet used in an image forming apparatus such as a printer and is a long continuous sheet on which continuous printing can be performed.

The "liquid" is not limited to any particular liquid and may be any liquid having a viscosity or a surface tension that can be discharged from a liquid discharge unit. However, preferably, the viscosity of the liquid is not greater than 30 mPa·s under ordinary temperature and ordinary pressure or by heating or cooling. More specifically, examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as deoxyribonucleic acid (DNA), amino acid, protein, or calcium, or an edible material, such as a natural colorant. The above-described examples may be used for inkjet inks, for example.

FIG. 1 is a diagram illustrating an overall configuration of a liquid discharge apparatus according to embodiments of the present disclosure. The liquid discharge apparatus 100 includes a sheet feeding device 101, a pre-coating device 102, a first image forming device 103*a*, a reversing device 104, and a second image forming device 103*b*.

The liquid discharge apparatus 100 causes the first image forming device 103*a* to form a full-color image on a first surface of the continuous sheet P and causes the second image forming device 103*b* to form a full-color image on a second surface opposite the first surface of the continuous sheet P while conveying the continuous sheet P along a conveyance direction 120.

The sheet feeding device 101 causes an unwinding unit 110 to rotate a rotatable roll in a state in which the continuous sheet P is wound and unwind the continuous sheet P to feed the continuous sheet P toward the pre-coating device 102.

The pre-coating device 102 applies a pre-coating liquid to the continuous sheet P, and includes the pre-coating liquid stored in a tank and a pair of rollers that nips the continuous sheet P and applies the pre-coating liquid to the continuous sheet P. The pre-coating liquid has a function of reducing bleeding by reacting with ink on the continuous sheet P.

The first image forming device 103*a* discharges ink to the continuous sheet P conveyed based on image data input to the liquid discharge apparatus 100 to apply the ink on the first surface of the continuous sheet P, thus forming an image on the first surface of the continuous sheet P.

The reversing device 104 reverses the surfaces of the continuous sheet P so that the second image forming device 103*b* applies ink to the second surface of the continuous sheet P. The reversing device 104 reverses the surfaces of the continuous sheet P that has been conveyed from an outlet of the first image forming device 103*a*, and then conveys the continuous sheet P to an inlet of the second image forming device 103*b*.

The second image forming device 103*b* discharges ink to the continuous sheet P conveyed based on image data input to the liquid discharge apparatus 100 to apply the ink on the second surface of the continuous sheet P, thus forming an image on the second surface of the continuous sheet P. The continuous sheet P on which an image is formed on the second surface by the second image forming device 103*b* is wound around, for example, a winding roller of a winding device.

In addition to the above configuration, the liquid discharge apparatus 100 may include a sheet ejection device including a winding unit that winds the continuous sheet P around a rotating roll to convey the continuous sheet, a heating device (drying device) that dries ink applied to the continuous sheet P by image formation, and a post-processing device that performs post-processing on the continuous sheet P after the image formation. The sheet feeding device 101, the pre-coating device 102, the reversing device 104, and the second image forming device 103*b* illustrated in FIG. 1 may not be included in the liquid discharge apparatus 100.

Example of Configuration Around First Image Forming Device 103*a*

Figure 2:
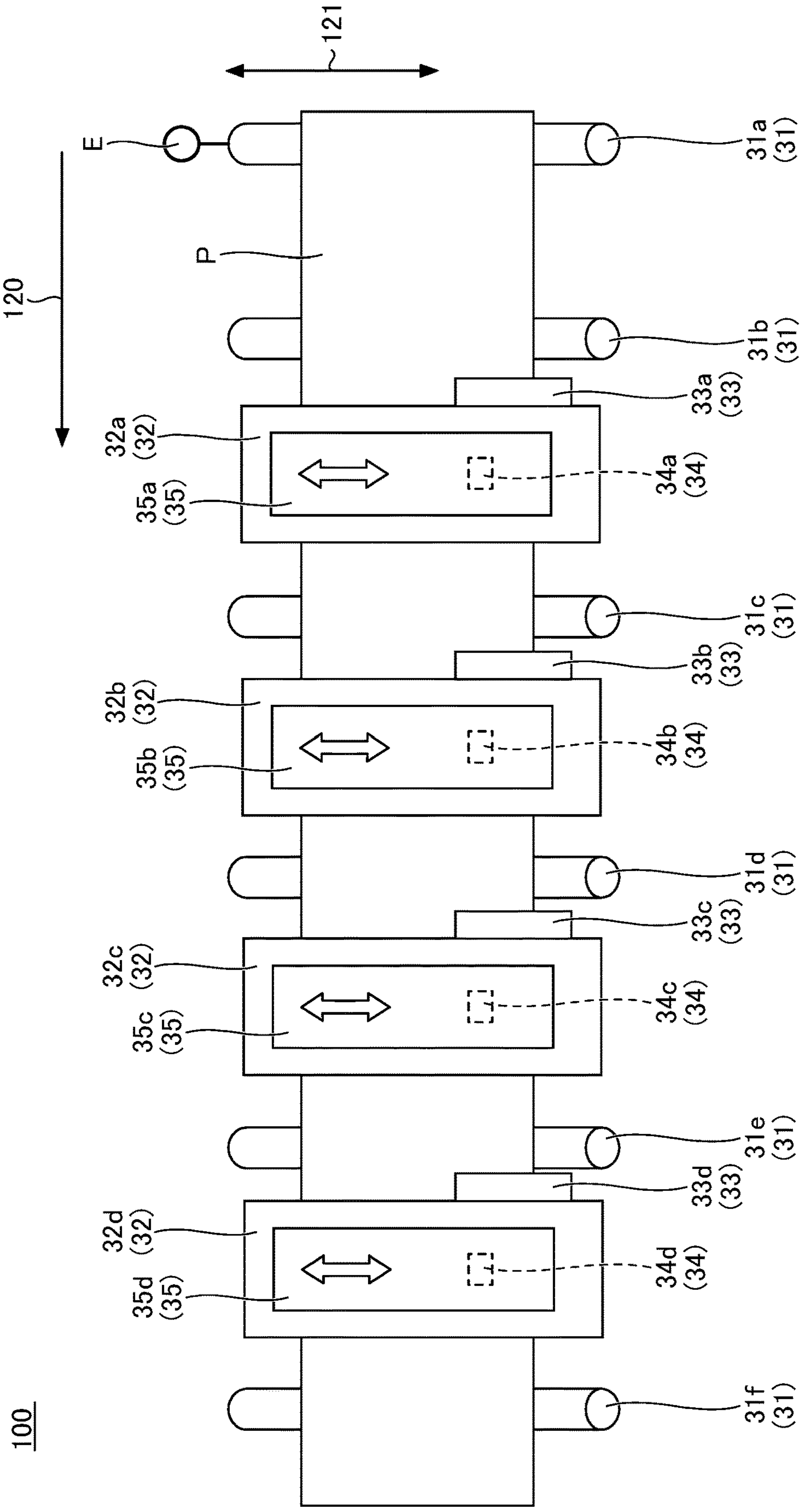
FIG. 2 is a diagram illustrating a configuration around a first image forming device according to embodiments of the present disclosure.

FIG. 2 is a diagram illustrating an example of the configuration around the first image forming device 103*a*. The liquid discharge apparatus 100 includes conveyance rollers 31*a* to 31*f* around the first image forming device 103*a*. The first image forming device 103*a* includes heads 32*a* to 32*d*, first actuators 33*a* to 33*d*, image sensors 34*a* to 34*d*, and second actuators 35*a* to 35*d*.

Since the conveyance rollers 31*a* to 31*f* have the same function, the conveyance rollers 31*a* to 31*f* are collectively referred to as conveyance rollers 31 unless otherwise distinguished. Similarly, the heads 32*a* to 32*d* are collectively referred to as heads 32 unless otherwise distinguished and the first actuators 33*a* to 33*d* are collectively referred to as first actuators 33 unless otherwise distinguished. In addition, the image sensors 34*a* to 34*d* are collectively referred to as image sensors 34 unless otherwise distinguished and the second actuators 35*a* to 35*d* are collectively referred to as second actuators 35 unless otherwise distinguished.

Each of the conveyance rollers 31 is an example of a conveyor to convey the continuous sheet P along the conveyance direction 120 in a state where tension is applied to the continuous sheet P. The number and arrangement of the conveyance rollers in the conveyor are not limited to any particular number and arrangement, and any number and arrangement of the conveyance rollers are used. The conveyor may include a tension roller that applies tension to the continuous sheet P being conveyed, a driving unit such as a motor, an unwinding roller, and a winding roller.

The tension roller is, for example, a roller displaceable in a direction intersecting with each of the conveyance direction 120 and the roller axial direction of the conveyance rollers 31. The tension roller can press the continuous sheet P being conveyed, in a direction intersecting with each of the conveyance direction 120 and the roller axial direction by displacement to apply tension to the continuous sheet P.

The heads 32 are an example of dischargers that is configured to discharge liquid such as ink to the continuous sheet P conveyed by the conveyance rollers 31. The head 32 is a functional component that discharges or jets ink from nozzles. Examples of an energy source for generating energy to discharge ink include a piezoelectric actuator (a laminated piezoelectric element or a thin-film piezoelectric element), a thermal actuator that employs a thermoelectric conversion element, such as a thermal resistor, and an electrostatic actuator including a diaphragm and opposed electrodes.

Each of the heads 32*a* to 32*d* is disposed at a different position along the conveyance direction 120 and discharges ink of a different color. For example, the head 32*a* discharges black ink, the head 32*b* discharges cyan ink, the head 32*c* discharges magenta ink, and the head 32*d* discharges yellow ink, and the heads 32*a* to 32*d* are disposed in this order from upstream to downstream in the conveyance direction 120. However, the colors of the ink discharged by the heads 32 and the compositions of the ink are not limited to any colors and compositions and can be appropriately changed according to the use or the specification of the liquid discharge apparatus 100. Further, a plurality of heads 32 may discharge ink of the same color or the same composition.

The head 32 includes a plurality of nozzles disposed along a width direction 121 intersecting the conveyance direction 120 and selectively discharges ink from the plurality of nozzles based on image data to form an image on the continuous sheet P. The width direction 121 is, for example, a direction substantially orthogonal to the conveyance direction 120 and substantially parallel to the roller axis direction of the conveyance rollers 31.

Note that the first image forming device 103*a* may include the plurality of heads 32 disposed along the width direction 121 for each color of ink. Since the first image forming device 103*a* includes the plurality of heads 32 disposed along the width direction 121, an image can be formed in a wider range in the width direction 121 at one time.

The first actuators 33 are an example of first movers that move the heads 32 along the width direction 121. The first actuator 33 moves in a cycle that is an integral multiple of the imaging cycle of the image sensors 34.

The first actuator 33 is configured to include a motor and a direct-acting mechanism. The direct-acting mechanism moves along the width direction 121 in accordance with rotation of the motor to move the head 32 fixed to the direct-acting mechanism along the width direction 121. However, the first actuator 33 is not limited to an actuator including a motor or a direct-acting mechanism, and the first actuator 33 may be a piezoelectric actuator element using a piezoelectric element or an electrostatic actuator using an electrostatic force.

The image sensors 34 are an example of output devices that is configured to output position information of the continuous sheet P in the width direction 121. The image sensors 34 are disposed in a manner such that an imaging direction is directed to the first surface of the conveyed continuous sheet P.

The image sensor 34 includes at least an imaging element such as a charge coupled device (CCD) or a complementary metal-oxide semiconductor (CMOS), and outputs a captured image of the first surface of the conveyed continuous sheet P as position information of the continuous sheet P.

In the present embodiment, the image sensor 34 includes a lens, and outputs a captured image focused on the first surface of the continuous sheet P. The captured image includes concavo-convex pattern information of the surface of the continuous sheet P based on paper fibers included in the continuous sheet P. The image sensor 34 may include a light source such as a light emitting diode (LED) that illuminates the continuous sheet P.

The image sensor 34 may include, for example, a laser light source that irradiates the first surface of the continuous sheet P with laser light, and may output a captured image including a speckle pattern generated by the irradiated laser light scattered in accordance with the concavo-convex shape of the surface of the first surface of the continuous sheet P.

The output device that outputs position information of the continuous sheet P is not limited to the image sensor 34, and may be any device that can output information indicating the position of the continuous sheet P in the width direction 121 or information related to the position of the continuous sheet P.

The second actuators 35 are an example of second movers that move the image sensors 34 along the width direction 121. The second actuator 35 is configured to include a motor and a direct-acting mechanism. The direct-acting mechanism moves along the width direction 121 in accordance with rotation of the motor to move the image sensor 34 fixed to the direct-acting mechanism along the width direction 121. However, the second actuator 35 is not limited to an actuator including a motor or a direct-acting mechanism, and the second actuator 35 may be a piezoelectric actuator element using a piezoelectric element or an electrostatic actuator using an electrostatic force.

In the present embodiment, the liquid discharge apparatus 100 includes a rotary encoder E provided in the conveyance roller 31*a*. The conveyance roller 31*a* is a driven roller that is disposed upstream from the head 32*a* in the conveyance direction 120 and is driven to rotate. The rotary encoder E can output a detection signal including conveyance amount information of the continuous sheet P.

Although the first image forming device 103*a* has been described with reference to FIG. 2, the second image forming device 103*b* also has a similar configuration to the first image forming device 103*a*. The second image forming device 103*b* may have a different configuration from the first image forming device 103*a*.

Example of Hardware Configuration of Controller 150

Figure 3:
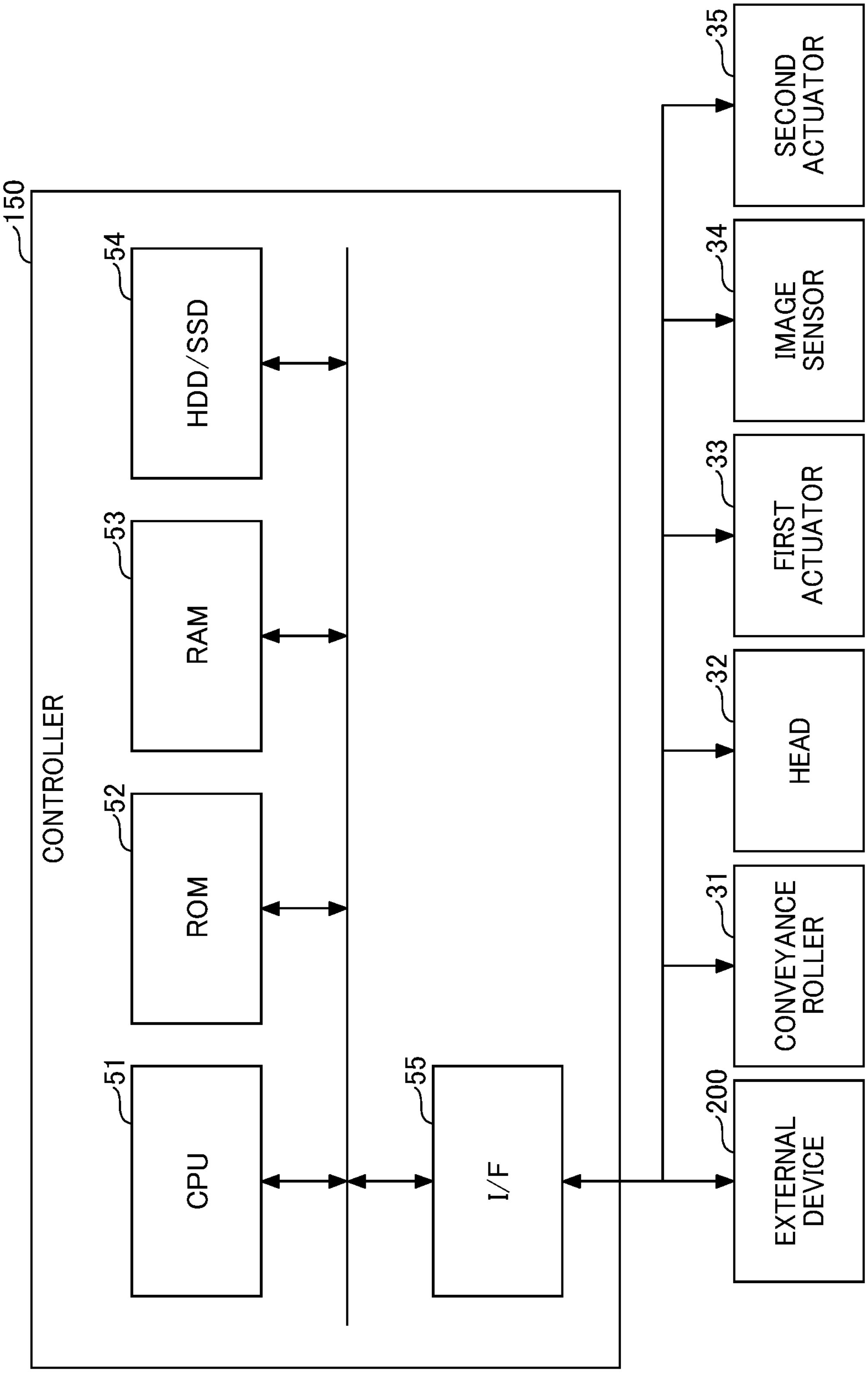
FIG. 3 is a diagram illustrating a hardware configuration of a controller according to embodiments of the present disclosure.

Next, a controller 150 included in the liquid discharge apparatus 100 is described. FIG. 3 is a diagram illustrating an example of the hardware configuration of the controller 150.

As illustrated in FIG. 3, the controller 150 includes a central processing unit (CPU) 51, a read only memory (ROM) 52, a random-access memory (RAM) 53, a hard disk drive (HDD)/solid state drive (SSD) 54, and an interface (I/F) 55.

The CPU 51 uses the RAM 53 as a work area and executes programs stored in the ROM 52.

The HDD/SSD 54 is used as a memory and stores setting values set in advance. The information stored in the HDD/SSD 54 may be read and used by the CPU 301 when the CPU 301 executes the programs.

The I/F 55 is an interface that communicably connects the external device 200, the conveyance rollers 31, the heads 32, the first actuators 33, the image sensors 34, and the second actuators 35 to the controller 150. The external device 200 is, for example, a client personal computer (PC).

First Embodiment

Example of Functional Configuration of Controller 150

Figure 4:
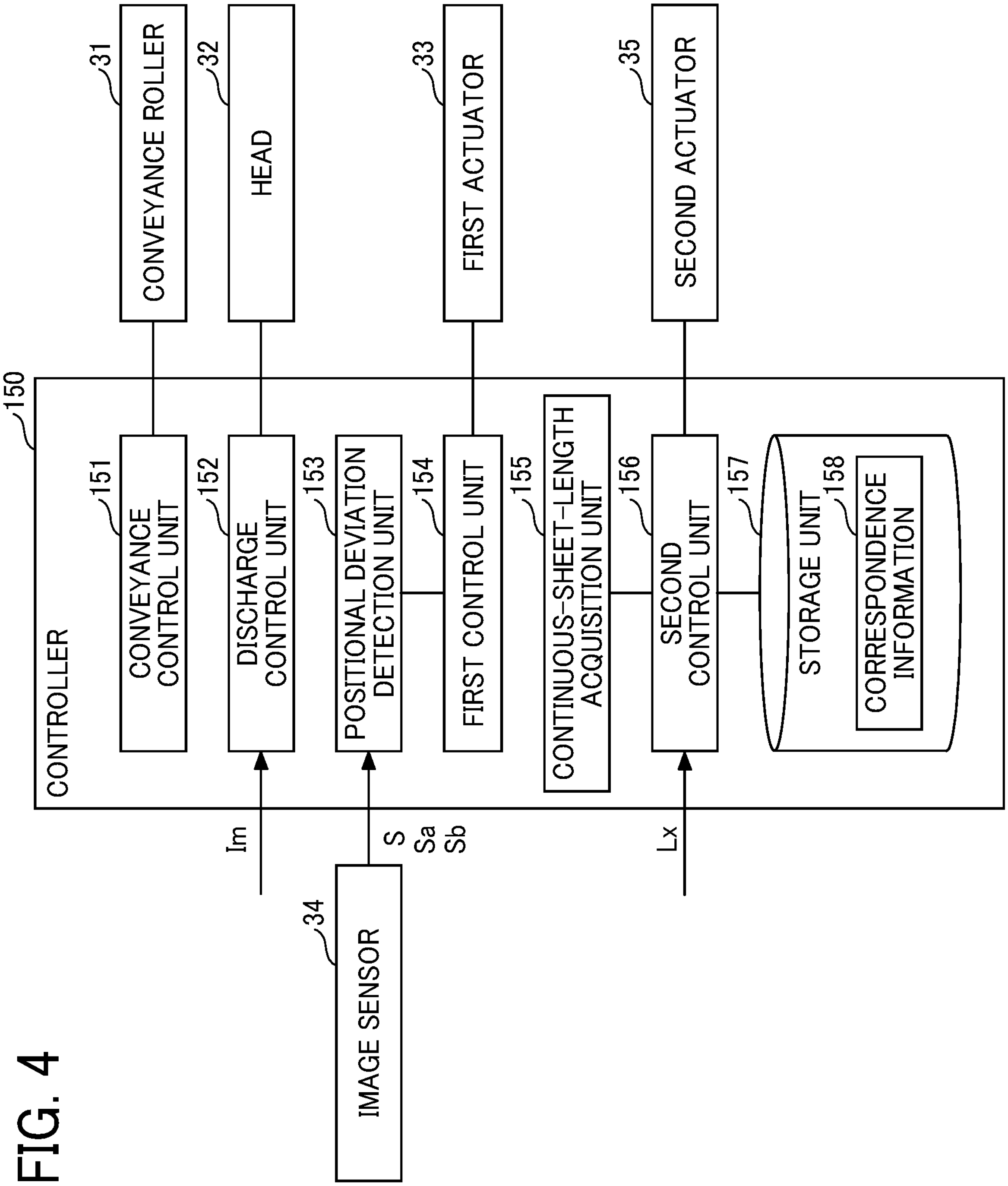
FIG. 4 is a diagram illustrating a functional configuration of a controller according to a first embodiment of the present disclosure.

FIG. 4 is a diagram illustrating the functional configuration of the controller 150 according to the first embodiment of the present disclosure. The controller 150 includes a conveyance control unit 151, a discharge control unit 152, a positional deviation detection unit 153, a first control unit 154, a continuous-sheet-length acquisition unit 155, a second control unit 156, and a storage unit 157.

The controller 150 causes the CPU 51 to execute the programs stored in the ROM 52 or HDD/SSD 54 and deployed to the RAM 53 to implement the respective functions of the conveyance control unit 151, the discharge control unit 152, the positional deviation detection unit 153, the first control unit 154, the continuous-sheet-length acquisition unit 155, and the second control unit 156. The controller 150 may implement at least a part of these functions by a circuit. The controller 150 implements the function of the storage unit 157 by the HDD/SSD 54. Note that at least some of the functions of each functional configuration unit illustrated in FIG. 4 may be implemented by configuration units other than the controller 150, such as the heads 32 or the external device.

The conveyance control unit 151 controls conveyance of the continuous sheet P by the conveyance rollers 31. In the present embodiment, the conveyance control unit 151 controls the rotation of a motor that drives the conveyance rollers 31 to control the conveyance of the continuous sheet P by the conveyance rollers 31.

The discharge control unit 152 controls the discharge of ink by the heads 32. In present the embodiment, the discharge control unit 152 applies a driving voltage having a predetermined voltage waveform to the heads 32 based on an image data Im to control the discharge of the ink by the heads 32.

The positional deviation detection unit 153 detects a positional deviation of the conveyed continuous sheet P along the width direction 121 based on captured images S of the continuous sheet P input from the image sensors 34. In the present embodiment, the positional deviation detection unit 153 inputs a plurality of captured images S obtained by capturing the same area of the continuous sheet P by different image sensors 34, performs a cross-correlation calculation of the plurality of captured images S, and then detects the positional deviation of the continuous sheet P.

For example, it is assumed that a conveyance speed v of the continuous sheet P is substantially constant, the distance between the image sensors **34*a* and 34*b* in the conveyance direction 120 is a predetermined distance d, and no positional deviation occurs in the continuous sheet P. In this case, a captured image Sa captured by the image sensor 34*a* at the predetermined timing substantially matches a captured image Sb captured by the image sensor 34*b* after a time of d/v has elapsed from the predetermined timing. However, when a positional deviation occurs in the width direction 121 in the continuous sheet P, the captured image Sb is shifted along the width direction 121 with respect to the captured image Sa in accordance with the positional deviation. The positional deviation detection unit 153 detects a deviation amount along the width direction 121** between the captured images S such as between the captured images Sa and Sb by a cross-correlation calculation, and outputs the deviation amount.

The positional deviation detection unit 153 may detect the deviation amount along the width direction 121 between the captured images S by a calculation method other than the cross-correlation calculation. However, the cross-correlation calculation is preferable in that the deviation amount can be detected at high speed and with high accuracy.

The first control unit 154 is an example of a first control unit that is configured to control movement of the first actuators 33 based on the output result of the image sensors 34. For example, the first control unit 154 inputs deviation amount information along the width direction 121 of the continuous sheet P detected by the position deviation detection unit 153 based on the output result of the image sensors 34. The first control unit 154 integrates the deviation amount information input from the position deviation detection unit 153 within a predetermined period and causes the first actuators 33 to move the heads 32 along the width direction 121 to correct the deviation of the continuous sheet P along the width direction 121 according to the integration result. Accordingly, the controller 150 can correct the positional deviation of ink which is discharged by the heads 32 and is applied to the continuous sheer P due to the deviation along the width direction 121 of the continuous sheet P.

The continuous-sheet-length acquisition unit 155 acquires information of a length Lx (length information) along the width direction 121 of the continuous sheet P. For example, the continuous-sheet-length acquisition unit 155 can acquire information on the length Lx by receiving input of the information from the external device 200. Information of the length Lx may be stored in the storage unit 157 in advance, and the continuous-sheet-length acquisition unit 155 may read and acquire the information of the length Lx from the storage unit 157.

The second control unit 156 is an example of a second control unit that controls the movement by the second actuators 35 based on the information of the length Lx of the continuous sheet P in the width direction 121 and expansion-and-contraction range information of the continuous sheet P in the width direction 121 to change the positions of the image sensors 34 in the width direction 121.

The expansion and contraction of the continuous sheet P indicates that the continuous sheet P expands and contracts. The expansion and contraction of the continuous sheet P in the width direction 121 indicates that the continuous sheet P expands and contracts along the width direction 121. When the continuous sheet P expands and contracts, the continuous sheet P deforms, which does not mean that the position of the continuous sheet P entirely shifts.

The expansion-and-contraction range information of the continuous sheet P includes, for example, information indicating a predetermined range in the width direction 121 on the continuous sheet P in which the amount of expansion and contraction of the continuous sheet P in the width direction 121 is equal to or less than a predetermined threshold value.

Since the liquid discharge apparatus 100 conveys the continuous sheet P in a state in which tension is applied, the continuous sheet P may expand and contract according to the applied tension. The expansion and contraction of one end of the continuous sheet P in the width direction 121 and the expansion and contraction of the other end of the continuous sheet P in the width direction 121 are substantially equal in amount of the expansion and contraction, and opposite in direction of the expansion and contraction. As a result, the expansion and contraction of the continuous sheet P is larger toward both ends of the continuous sheet P in the width direction 121 and smaller toward the center from the end side. The amount of expansion and contraction of the continuous sheet P in the width direction 121 is correlated with the tension applied to the continuous sheet P.

In the present embodiment, the amount of expansion and contraction of the continuous sheet P corresponding to tension is examined in advance, and a predetermined range in the width direction 121 on the continuous sheet P in which the amount of expansion and contraction is equal to or less than a predetermined threshold value is determined in advance. In a case where the length of the continuous sheet P in the width direction 121 is different, the predetermined range is different. In the present embodiment, the predetermined range is associated with each length of the continuous sheet P in the width direction 121 and is stored in the storage unit 157 as correspondence information 158.

In other words, the storage unit 157 stores the correspondence information 158. The correspondence information 158 is predetermined information on correspondence between the information of the length Lx of the continuous sheet P and the expansion-and-contraction range information of the continuous sheet P. The second control unit 156 changes the position of the image sensors 34 so that the image sensors 34 are disposed within a predetermined range on the continuous sheet P based on the expansion-and-contraction range information of the continuous sheet P acquired with reference to the storage unit 157 based on the information of the length Lx of the continuous sheet P. Note that the second control unit 156 causes the second actuators 35*a*, 35*b*, 35*c*, and 35*d* to change the positions of the image sensors 34*a*, 34*b*, 34*c*, and 34*d*, respectively.

Operation Example of Liquid Discharge Apparatus 100

Figure 5:
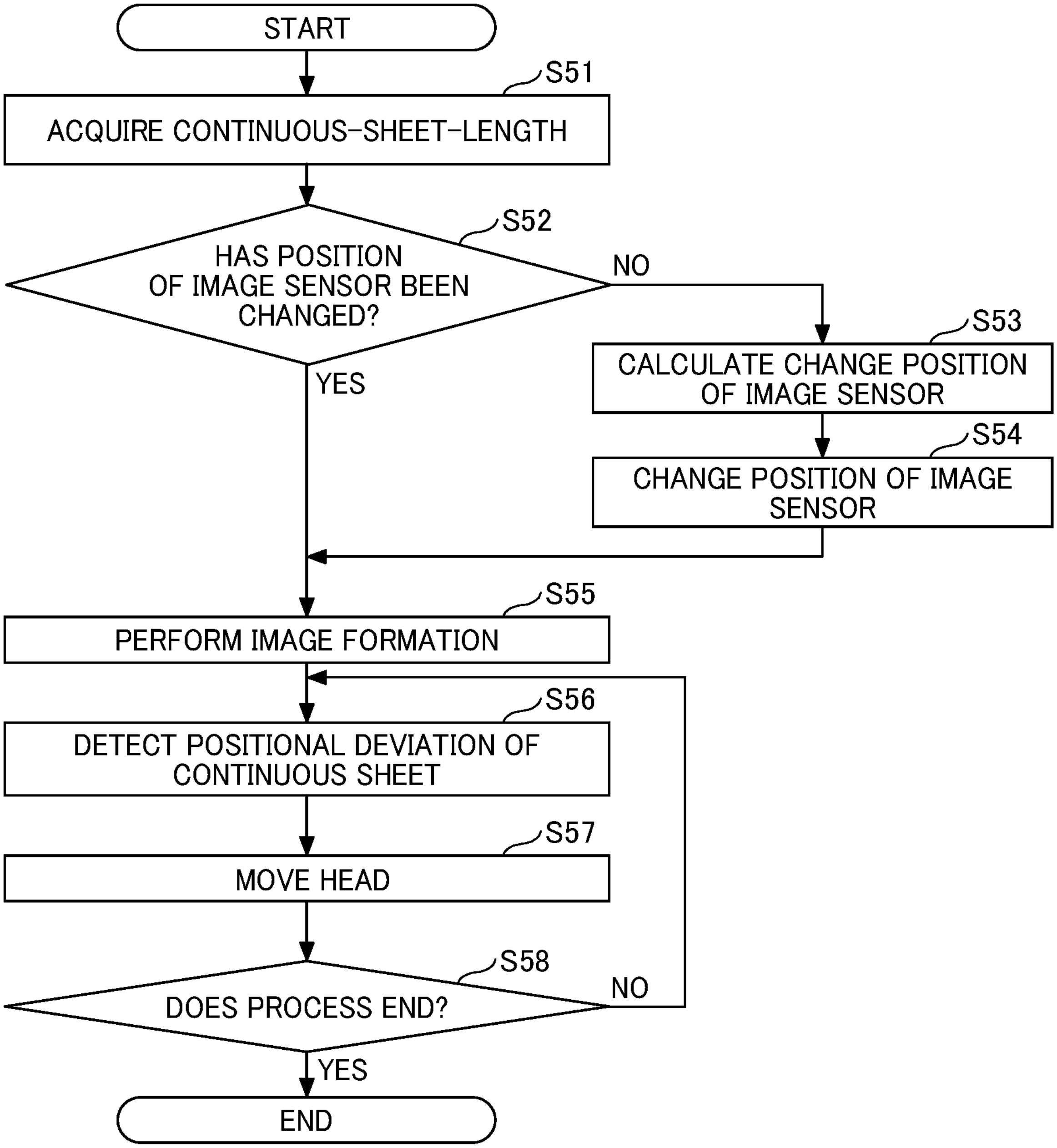
FIG. 5 is a flowchart of an operation of a liquid discharge apparatus according to the first embodiment of the present disclosure.

FIG. 5 is a flowchart of an operation of the liquid discharge apparatus 100. The liquid discharge apparatus 100 starts the operation illustrated in FIG. 5 when the image data Im is received from the external device 200 or when a user of the liquid discharge apparatus 100 performs an input operation for starting image formation via an operation unit of the liquid discharge apparatus 100.

First, in step S51, the liquid discharge apparatus 100 causes the continuous-sheet-length acquisition unit 155 to acquire information of the length Lx of the continuous sheet P in the width direction 121 by receiving input of the information of the length Lx from the external device 200. The liquid discharge apparatus 100 may receive a print job including the image data Im and the information of the length Lx, and the continuous-sheet-length acquisition unit 155 may acquire the information of the length Lx from the print job. The order of the execution of step S51 can be appropriately changed as long as the execution of step S51 is before the execution of step S53.

Subsequently, in step S52, the liquid discharge apparatus 100 causes the controller 150 to determine whether the positions of the image sensors 34 have been changed.

In step S52, when the controller 150 determines that the positions of the image sensors 34 have been changed (YES in step S52), the liquid discharge apparatus 100 proceeds the operation to step S55.

On the other hand, when the controller 150 determines that the positions of the image sensors 34 have not been changed in step 52 (NO in step 52), in step S53, the liquid discharge apparatus 100 causes the second control unit 156 to calculate target positions to which the positions of the image sensors 34 are to be changed based on the expansion-and-contraction range information of the continuous sheet P acquired with reference to the storage unit 157 based on the information of the lengths Lx of the continuous sheet P.

Subsequently, in step S54, the liquid discharge apparatus 100 causes the second control unit 156 to change the positions of the image sensors 34 so that the image sensors 34 are disposed within a predetermined range on the continuous sheet P according to the calculated target positions.

Subsequently, in step S55, the liquid discharge apparatus 100 causes the discharge control unit 152 to discharge ink from the heads 32 based on the image date Im and performs image formation on the continuous sheet P.

Subsequently, in step S56, the liquid discharge apparatus 100 causes the positional deviation detection unit 153 to detect the positional deviation of the conveyed continuous sheet P along the width direction 121 based on the captured images S of the continuous sheet P output from the image sensors 34.

Subsequently, in step S57, the liquid discharge apparatus 100 causes the first control unit 154 to control the first actuators 33 based on the positional deviation amount information along the width direction 121 of the continuous sheet P input from the positional deviation detection unit 153 and moves the heads 32 along the width direction 121 so that the deviation along the width direction 121 of the continuous sheet P is corrected.

Subsequently, in step S58, the liquid discharge apparatus 100 causes the controller 150 to determine whether the image formation is to be ended. For example, the controller 150 determines whether the image formation is to be ended in accordance with information of the number of print copies included in the print job or in response to an operation input of ending the image formation by the user via the operation unit of the liquid discharge apparatus 100.

In step S58, when the controller 150 determines that the image formation is to be ended (YES in step S58), the liquid discharge apparatus 100 ends the operation of the image formation. In step S58, when the controller 150 determines that the image formation is not to be ended (NO in step S58), the liquid discharge apparatus 100 performs the operation of step S56 and the subsequent steps again.

As described above, the liquid discharge apparatus 100 can form an image on the continuous sheet P while changing the positions of the image sensors 34.

Operation of Liquid Discharge Apparatus 100

Figure 6:
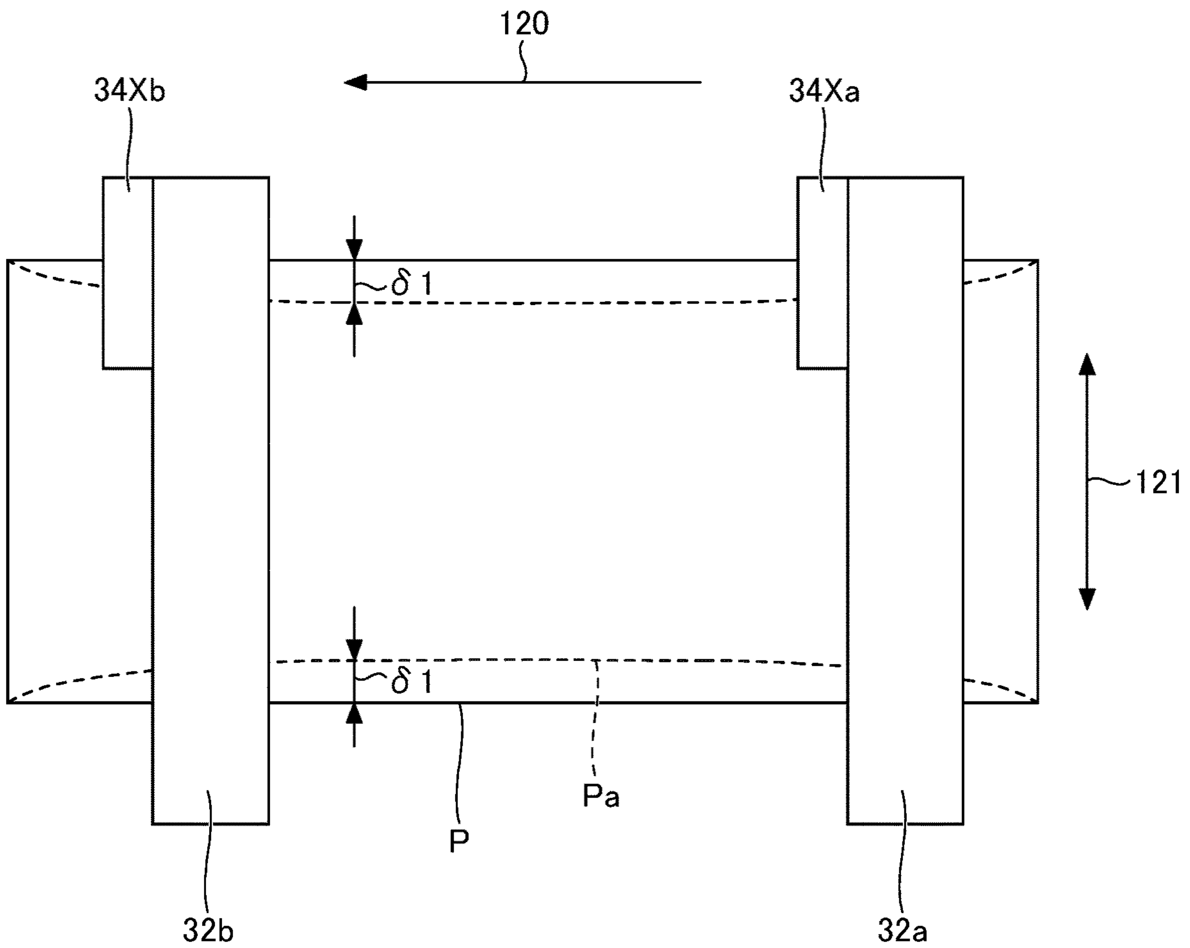
FIG. 6 is a diagram illustrating an example of expansion and contraction of a continuous sheet.
Figure 7:
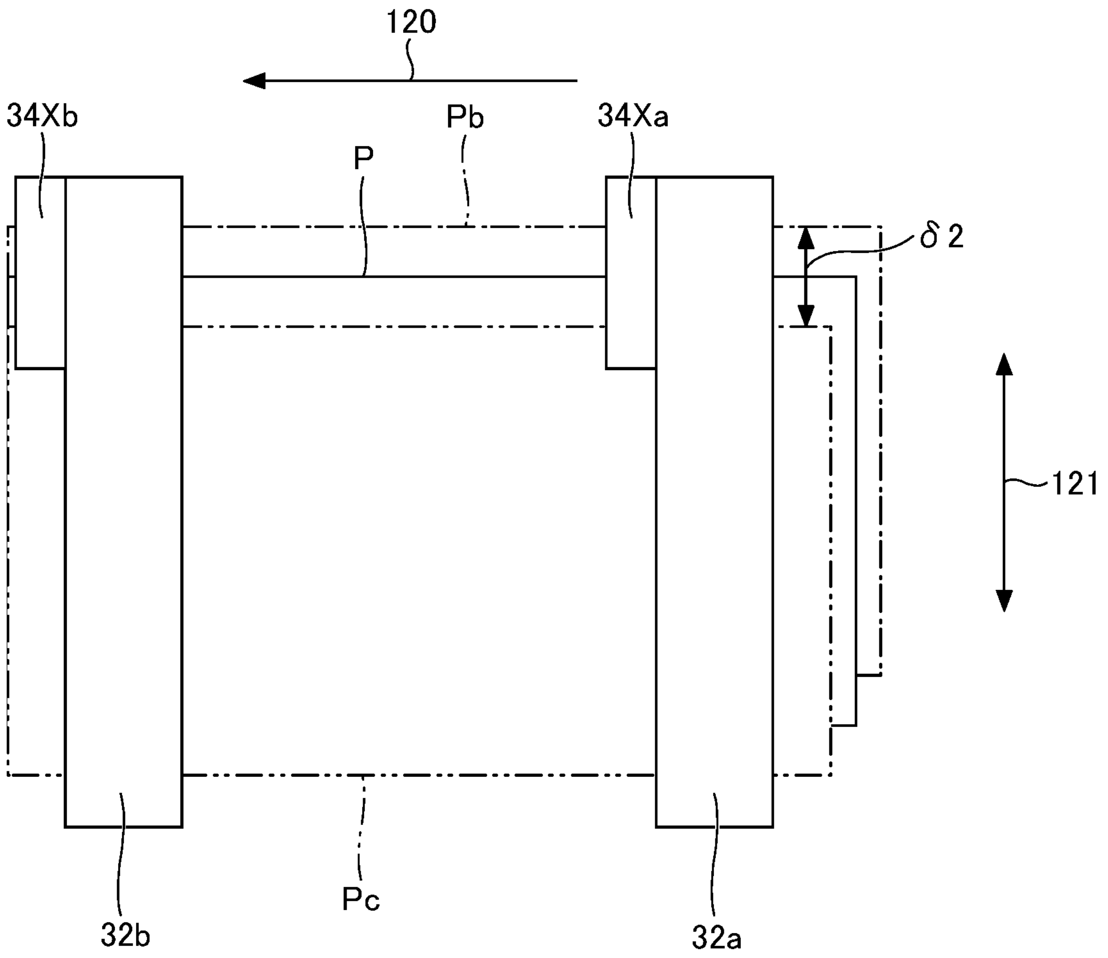
FIG. 7 is a diagram illustrating an example of meandering of the continuous sheet.
Figure 8:
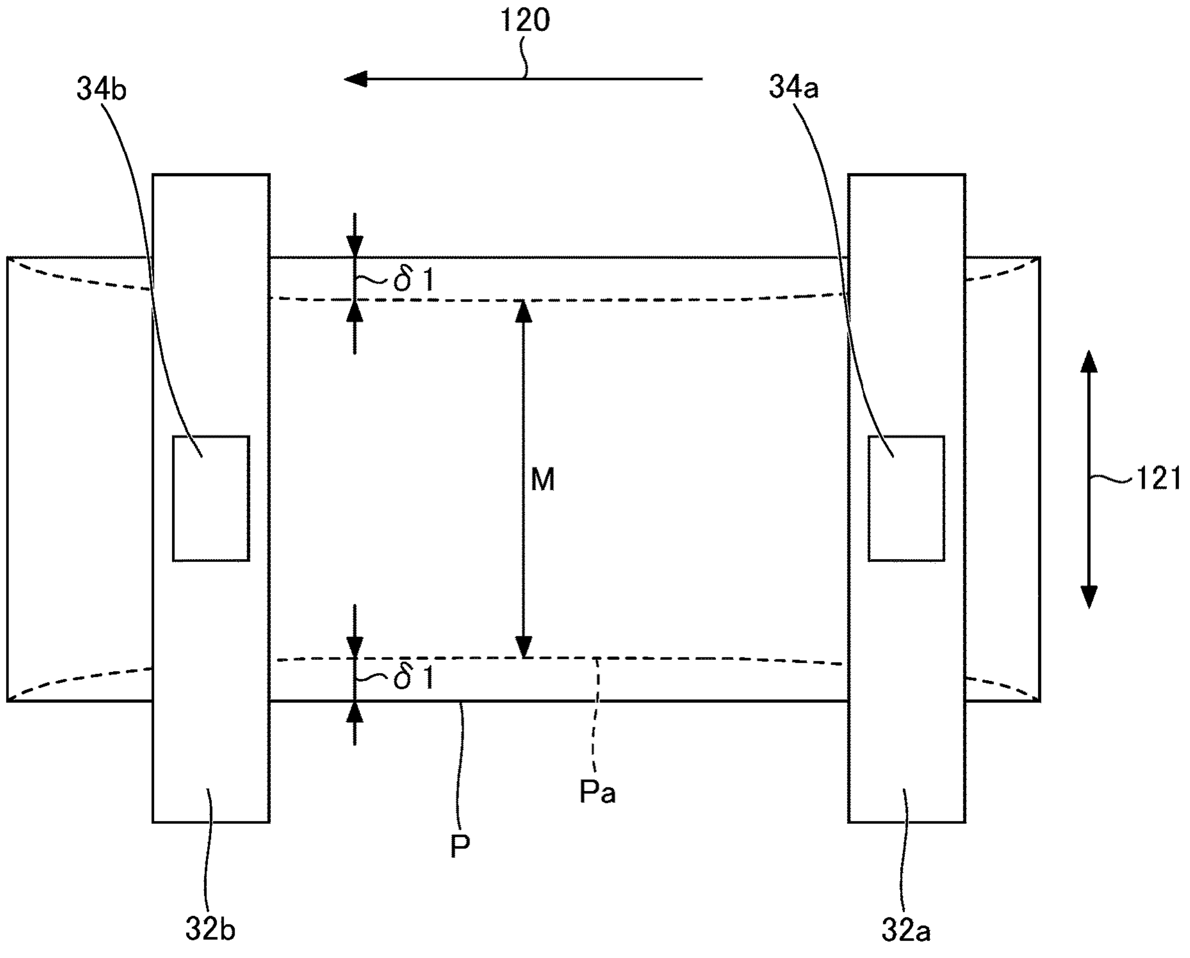
FIG. 8 is a first diagram illustrating an operation of changing positions of image sensors according to the first embodiment of the present disclosure.
Figure 9:
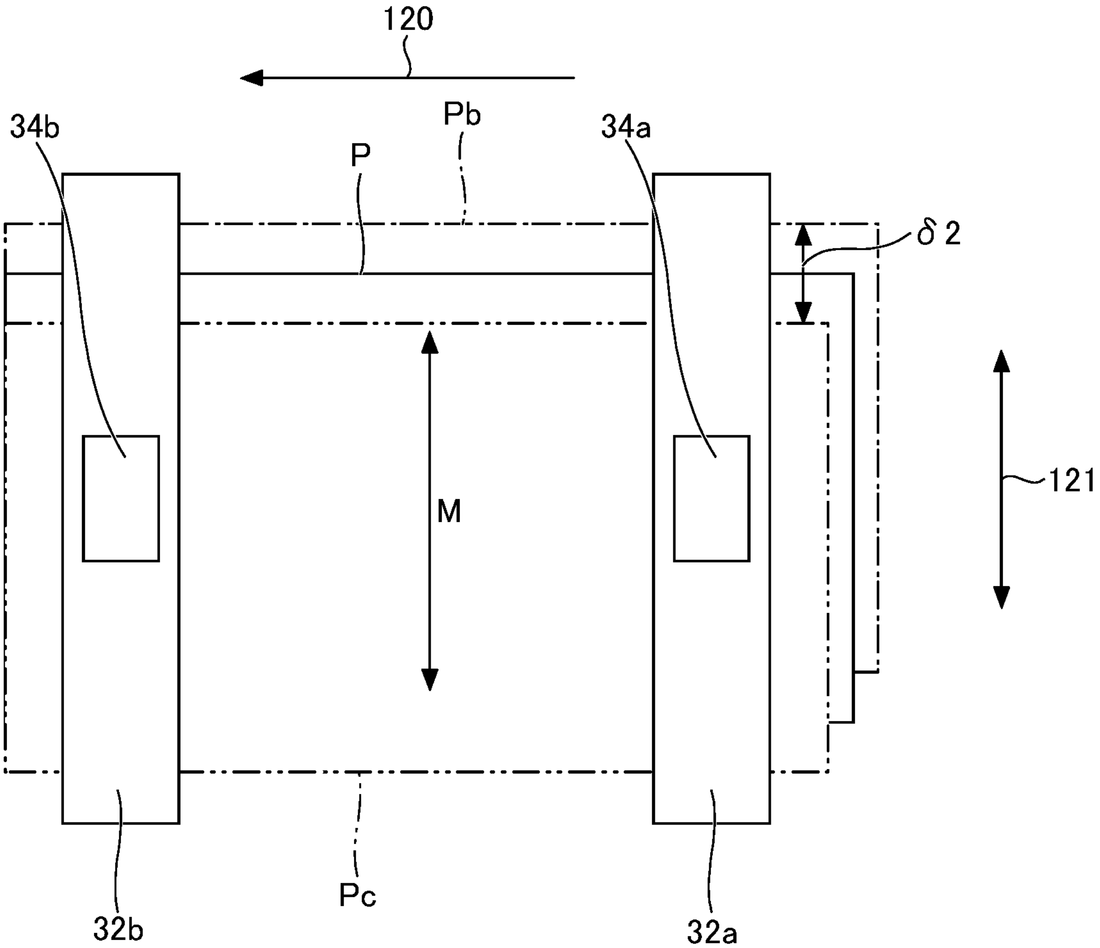
FIG. 9 is a second diagram illustrating the operation of changing the positions of the image sensors according to the first embodiment of the present disclosure.

The operation of the liquid discharge apparatus 100 is described with reference to FIGS. 6 to 9. FIG. 6 is a diagram illustrating an example of the expansion and contraction of the continuous sheet P. FIG. 7 is a diagram illustrating an example of meandering of the continuous sheet P. FIGS. 8 and 9 are diagrams illustrating an operation of changing the positions of the image sensors 34. FIG. 8 is a first diagram of the operation of changing the positions of the image sensors 34. FIG. 9 is a second diagram of the operation of changing the positions of the image sensors 34.

In FIGS. 6 to 9, a part around the head 32*a* and the head 32*b* is illustrated. However, the effect of expansion and contraction and meandering on the positional deviation of the continuous sheet P and the position change operation of the image sensors 34 are similar for each position of the heads 32.

The meandering of the continuous sheet P indicates that the continuous sheet P advances while winding like a snake during conveyance. When the continuous sheet P meanders, the continuous sheet P does not deform, and the position of the continuous sheet P entirely shifts in a similar manner.

Edge sensors 34Xa and 34Xb illustrated in FIGS. 6 and 7 are output devices according to a control sample (output devices to which the present embodiment is not applied), and are sensors that detect the position of the edge of the continuous sheet P in the width direction 121.

An expansion-and-contraction edge position Pa indicated by a broken line in FIG. 6 represents a position at which the continuous sheet P has contracted. An expansion-and-contraction amount δ1 indicates the amount of movement of the edge of the continuous sheet P due to contraction of the continuous sheet P.

As illustrated in FIG. 6, in the edge sensors 34Xa and 34Xb that detect the positions of the edge of the continuous sheet P in the width direction 121, the detection results include the expansion-and-contraction amount δ1 of the continuous sheet P.

On the other hand, a first meandering edge position Pb indicated by a dash-single-dot line in FIG. 7 indicates a position of an edge of the continuous sheet P whose position is deviated to one side in the width direction 121 due to meandering of the continuous sheet P. A first meandering edge position Pc indicated by a dash-single-dot line in FIG. 7 indicates a position of an edge of the continuous sheet P whose position is deviated to the other side in the width direction 121 due to meandering of the continuous sheet P. A meandering amount δ2 is a positional deviation amount of the edge of the continuous sheet P due to meandering of the continuous sheet P.

The correction in which the first control unit 154 moves the heads 32 acts properly in a case where the position of the continuous sheet P entirely shifts in a similar manner. Since the position of the continuous sheet P does not entirely shift in a similar manner, the expansion-and-contraction amount δ1 of the continuous sheet P is not corrected even when the first control unit 154 moves the heads 32.

The detection results by the edge sensors 34Xa and 34Xb include both the meandering amount δ2 of the continuous sheet P and the expansion-and-contraction amount δ1 of the continuous sheet P. Consequently, when the positions of the heads 32 in the width direction 121 are corrected in accordance with the detection results obtained by the edge sensors 34Xa and 34Xb, correction errors occur, and the correction accuracy decreases.

In the present embodiment, as illustrated in FIGS. 8 and 9, the image sensors 34*a* and 34*b* are disposed within a predetermined range M in the width direction 121 on the continuous sheet P in which the amount of expansion and contraction is equal to or less than a predetermined value. As a result, the expansion-and-contraction amount δ1 of the continuous sheet P included in the captured images S of the continuous sheet P output from the image sensors 34*a* and 34*b* is reduced.

When the positions of the heads 32 in the width direction 121 are corrected based on the captured images S of the continuous sheet P output from the image sensors 34*a* and 34*b*, the liquid discharge apparatus 100 can reduce correction errors of the positional deviation due to the meandering amount δ2 of the continuous sheet P and can obtain high position correction accuracy.

As described above, in the present embodiment, the liquid discharge apparatus 100 includes the conveyance rollers 31 (conveyor) that convey the continuous sheet P (elongated web) in the conveyance direction 120 under tension, and the heads 32 (discharger) that discharge ink (liquid) to the continuous sheet P conveyed by the conveyance rollers 31. In addition, the liquid discharge apparatus 100 includes the first actuators 33 (first mover) that move the heads 32 in the width direction 121, the image sensors 34 (output device) that output the captured images S (position information) of the continuous sheet P in the width direction 121, and the second actuators 35 (second mover) that move the image sensors 34 in the width direction 121.

Further, the liquid discharge apparatus 100 includes the first control unit 154 (first control unit) that controls the movement of the first actuators 33 based on the output results of the image sensors 34, and the second control unit 156 (second control unit) that controls the movement of the second actuators 35 based on information of the length Lx (length information) of the continuous sheet P in the width direction 121 and expansion-and-contraction range information of the continuous sheet P in the width direction 121 to change the positions of the image sensors 34 in the width direction 121.

For example, the expansion-and-contraction range information of the continuous sheet P includes information indicating a predetermined range M in the width direction 121 on the continuous sheet P in which an expansion-and-contraction amount δ1 of the continuous sheet P in the width direction 121 is equal to or less than a predetermined threshold value. The second actuators 35 change the positions of the image sensors 34 in a manner such that the image sensors 34 are disposed within the predetermined range M on the continuous sheet P.

Since the image sensors 34 are disposed within the predetermined range M, the expansion-and-contraction amount δ1 of the continuous sheet P included in the captured images S output by the image sensors 34 is reduced. As a result, the liquid discharge apparatus 100 can reduce correction errors of the positional deviation due to the meandering amount δ2 of the continuous sheet P and can obtain high position correction accuracy. In other words, in the present embodiment, the liquid discharge apparatus 100 can be provided that is excellent in position correction accuracy in the width direction 121 intersecting the conveyance direction 120 of the continuous sheet P conveyed in a state in which tension is applied.

In the present embodiment, the liquid discharge apparatus 100 includes the plurality of image sensors 34 which are disposed at different positions in the conveyance direction 120 to capture images of the continuous sheet P as output device, and outputs captured images S of the continuous sheet P captured at different positions by the plurality of image sensors 34. The above-described configuration allows the position of the continuous sheet P in the width direction 121 to be detected without using the edge position of the continuous sheet P. As a result, the liquid discharge apparatus 100 can reduce the effect of the expansion-and-contraction amount δ1 of the continuous sheet P and can obtain high position correction accuracy in the width direction 121 intersecting the conveyance direction 120 of the continuous sheet P conveyed in a state in which tension is applied.

In the present embodiment, the liquid discharge apparatus 100 further includes the storage unit 157 that is configured to store correspondence information such as the correspondence information 158. The correspondence information 158 is predetermined information on correspondence between information of the length Lx of the continuous sheet P in the width direction 121 and expansion-and-contraction range information of the continuous sheet Pin the width direction 121. The second control unit 156 refers to the storage unit 157 based on the information of the length Lx of the continuous sheet P to acquire the expansion-and-contraction range information of the continuous sheet P. Then, the second control unit 156 changes the positions of the image sensors 34 in the width direction 121 based on the expansion-and-contraction range information of the continuous sheet P. Accordingly, the liquid discharge apparatus 100 can dispose the image sensors 34 within the predetermined range M, reduce correction errors of the position deviation due to the meandering amount δ2 of the continuous sheet P, and obtain high position correction accuracy.

Second Embodiment

Next, a liquid discharge apparatus 100*a* according to a second embodiment is described. Note that the same components as the components described in the first embodiment are denoted by the same reference numerals, and redundant descriptions thereof are omitted as appropriate.

Figure 10:
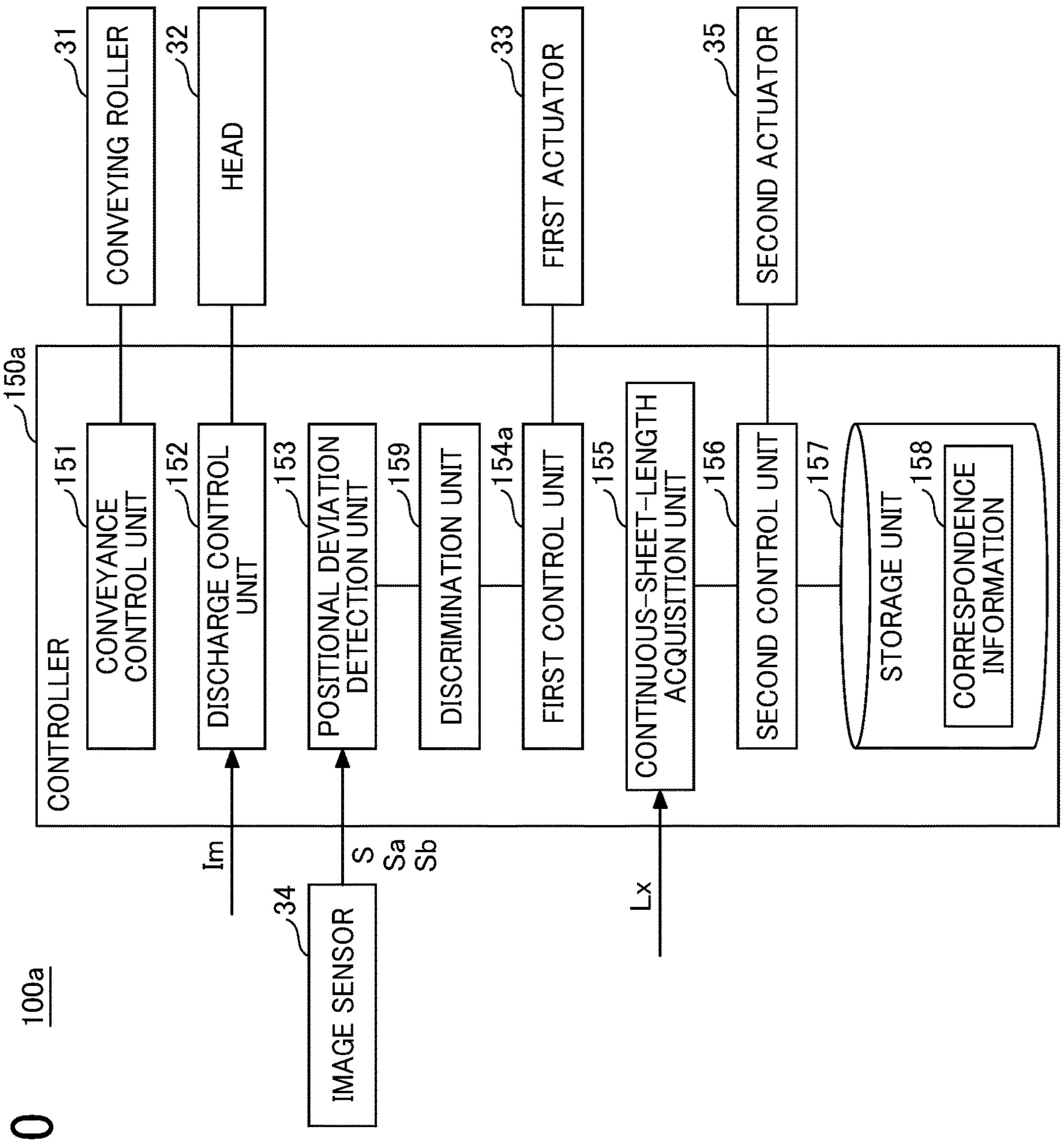
FIG. 10 is a diagram illustrating a functional configuration of a controller according to a second embodiment of the present disclosure.

FIG. 10 is a block diagram illustrating an example of the functional configuration of a controller 150*a* included in the liquid discharge apparatus 100*a*. The controller 150*a* includes a determination unit 159 and a first control unit 154*a*.

The controller 150*a* causes the CPU 51 to execute programs stored in the ROM 52 or HDD/SSD 54 and deployed to the RAM 53 to implement the respective functions of the determination unit 159 and the first control unit 154*a*. The controller 150 may implement at least a part of these functions by a circuit.

The determination unit 159 is an example of a determination unit that discriminates the expansion-and-contraction amount δ1 of the continuous sheet P and the meandering amount δ2 of the continuous sheet P based on first position information of the continuous sheet P and second position information of the continuous sheet P. The first position information is information output from the image sensors 34 in a state in which the image sensors 34 are disposed in the predetermined range M on the continuous sheet P. The second position information is information output from the image sensors 34 in a state in which the image sensors 34 are disposed outside the predetermined range M on the continuous sheet P.

The expansion-and-contraction amount δ1 of the continuous sheet P included in the first position information is reduced. On the other hand, since the expansion-and-contraction amount δ1 of the continuous sheet P included in the second position information is larger than the expansion-and-contraction amount δ1 in the first position information, both the expansion-and-contraction amount δ1 and the meandering amount δ2 are included in the second position information. The determination unit 159 can acquire positional deviation information mainly including the expansion-and-contraction amount δ1 by subtracting the first position information from the second position information and can acquire positional deviation information mainly including the meandering amount δ2 by subtracting the expansion-and-contraction amount δ1 from the second position information. In other words, the determination unit 159 can discriminate the expansion-and-contraction amount δ1 from the meandering amount δ2.

The first control unit 154*a* controls the movement by the first actuators 33 based on the meandering amount δ2 discriminated by the determination unit 159.

Figure 11:
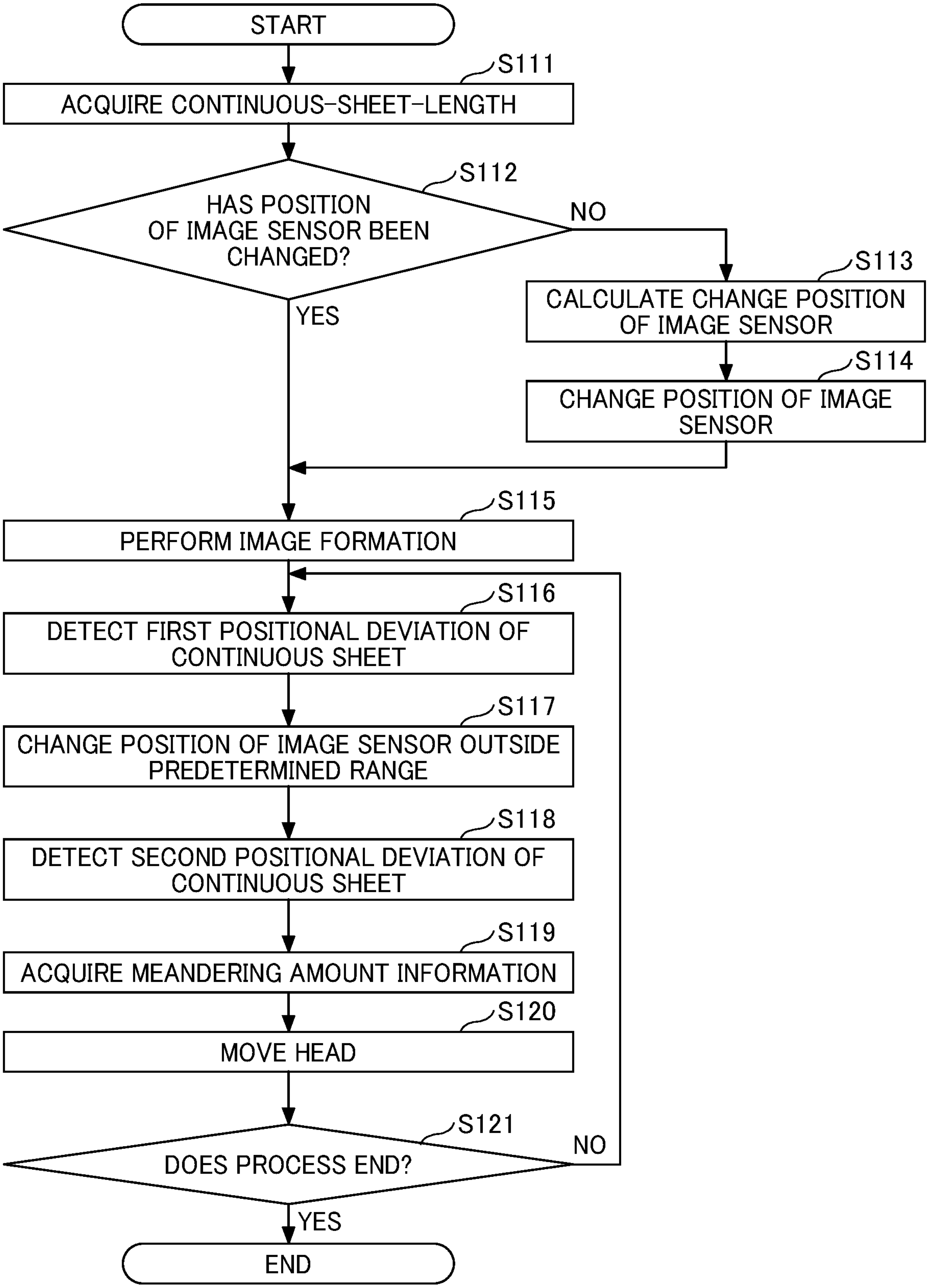
FIG. 11 is a flowchart of an operation of a liquid discharge apparatus according to the second embodiment of the present disclosure.

FIG. 11 is a flowchart of an example of the operation of the liquid discharge apparatus 100*a*. The start timing of the operation illustrated in FIG. 11 is the same as the start timing of the operation illustrated in FIG. 5. The operations from step S111 to step S115 illustrated in FIG. 11 are the same as the operations from step S51 to step S55 illustrated in FIG. 5. The operations in step S120 and step S121 illustrated in FIG. 11 are the same as the operations in step S57 and step S58 illustrated in FIG. 5. Below, redundant descriptions of the same operations may be omitted, and the differences from the operations illustrated in FIG. 5 are mainly described.

In Step S116, the liquid discharge apparatus 100*a* causes the positional deviation detection unit 153 to detect the first position information along the width direction 121 of the continuous sheet P to be conveyed based on the captured images S of the continuous sheet P output from the image sensors 34.

Subsequently, in step S117, the liquid discharge apparatus 100*a* causes the second control unit 156 to change the positions of the image sensors 34 so that the image sensors 34 are disposed outside the predetermined range on the continuous sheet P according to the calculated changed position.

Subsequently, in step S118, the liquid discharge apparatus 100*a* causes the positional deviation detection unit 153 to detect the second position information along the width direction 121 of the continuous sheet P to be conveyed based on the captured images S of the continuous sheet P output from the image sensors 34.

Subsequently, in step S119, the liquid discharge apparatus 100*a* causes the determination unit 159 to discriminate the expansion-and-contraction amount δ1 from the meandering amount δ2 to acquire information of the meandering amount δ2. The first control unit 154*a* controls the movement by the first actuators 33 based on the meandering amount δ2 acquired by the determination unit 159.

As described above, the liquid discharge apparatus 100*a* can discriminate the expansion-and-contraction amount δ1 from the meandering amount δ2 and can control the positions of the heads 32 based on the discriminated meandering amount δ2.

As described above, the liquid discharge apparatus 100*a* according to the present embodiment includes the determination unit 159 (determination unit) that discriminates the expansion-and-contraction amount δ1 of the continuous sheet P and the meandering amount δ2 of the continuous sheet P based on first position information of the continuous sheet P and second position information of the continuous sheet P. The first position information is information output from the image sensors 34 in a state in which the image sensors 34 are disposed in the predetermined range M on the continuous sheet P. The second position information is information output from the image sensors 34 in a state in which the image sensors 34 are disposed outside the predetermined range M on the continuous sheet P. The first control unit 154*a* controls the movement of the first actuators 33 based on the meandering amount δ2 discriminated by the determination unit 159. Accordingly, since the effect of the expansion-and-contraction amount δ1 can be removed, high position correction accuracy can be obtained. In other words, in the present embodiment, the liquid discharge apparatus 100*a* can be provided that is excellent in position correction accuracy in the width direction 121 intersecting the conveyance direction 120 of the continuous sheet P conveyed in a state in which tension is applied.

Third Embodiment

In the liquid discharge apparatuses according to the above-described embodiments, the image sensors serving as the output devices are disposed directly below the plurality of heads. On the other hand, in a liquid discharge apparatus according to a third embodiment, output devices are not disposed directly below some of the plurality of heads. In other words, the liquid discharge apparatus according to the present embodiment includes the output devices directly below some of the plurality of heads. Below, the liquid discharge apparatus according to the third embodiment and modified examples of the liquid discharge apparatus are described.

Figure 12:
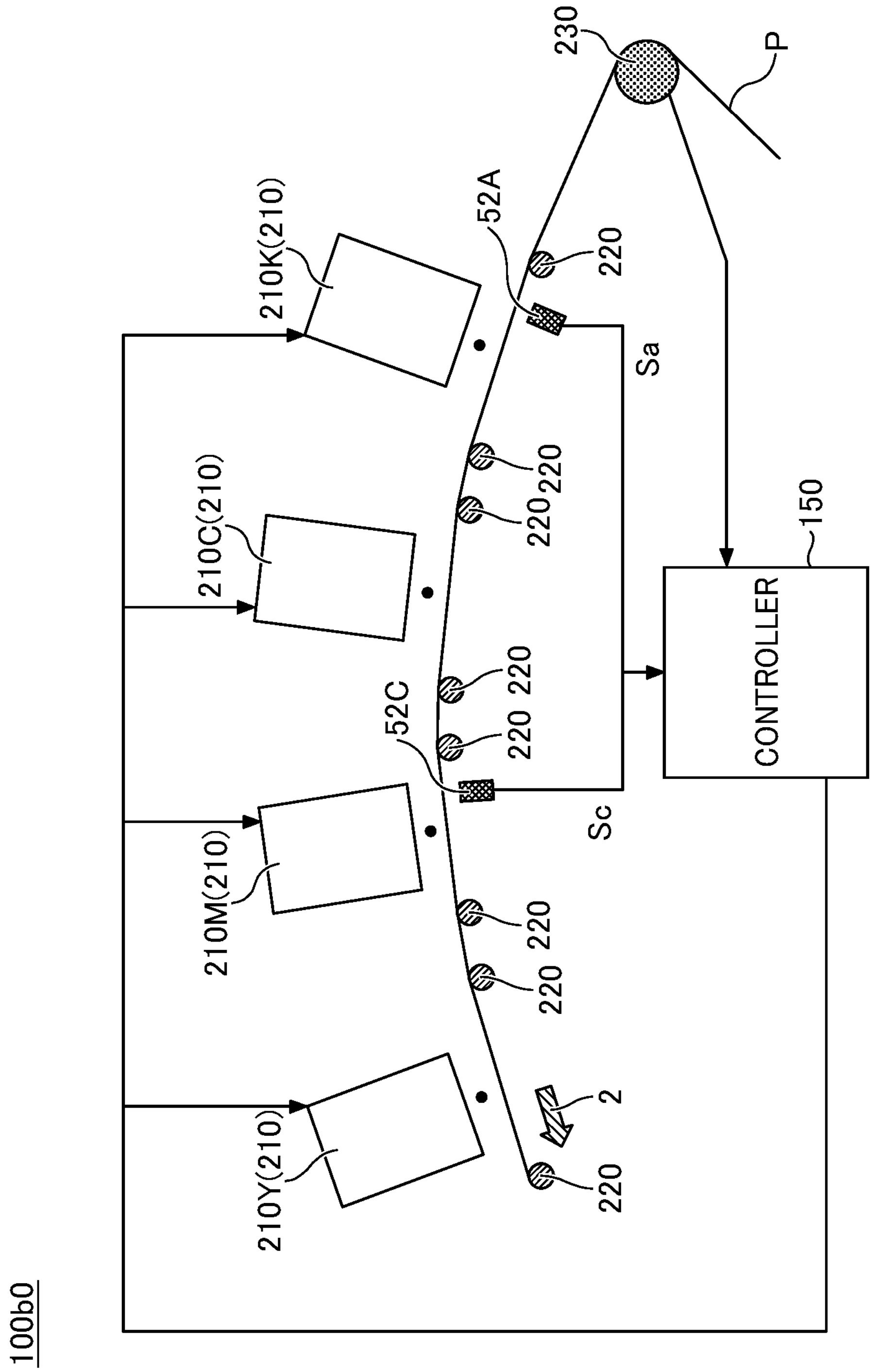
FIG. 12 is a diagram illustrating a liquid discharge apparatus according to a third embodiment of the present disclosure.

FIG. 12 is a diagram illustrating a liquid discharge apparatus 100*b*0 according to the third embodiment of the present disclosure. The liquid discharge apparatus 100*b*0 discharges ink from each of heads 210K, 210Y, 210M, and 210C and applies ink to a continuous sheet P to form an image. FIG. 12 is a diagram indicating the heads 210K, 210Y, 210M, and 210C, and the configuration around these heads, as viewed in the width direction substantially orthogonal to a conveyance direction 2.

The head 210K discharges black ink. The head 210Y discharges yellow ink. The head 210M discharges magenta ink. The head 210C discharges cyan ink. The liquid discharge apparatus 100*b*0 forms a color image on the continuous sheet P with the respective color inks. Below, the heads 210K, 210Y, 210M, and 210C are collectively referred to as the heads 210 unless otherwise particularly distinguished.

As illustrated in FIG. 12, the liquid discharge apparatus 100*b*0 includes the heads 210K, 210Y, 210M, and 210C around the continuous sheet P. The liquid discharge apparatus 100*b*0 discharges ink from the heads 210K, 210Y, 210M, and 210C to the continuous sheet P conveyed.

The continuous sheet P is stretched across a driving roller 230 and eight support rollers 220. The continuous sheet P is driven by the rotation of the driving roller 230 and moves along the conveyance direction 2 illustrated in FIG. 12. The conveyance direction 2 is a direction in which the continuous sheet P moves by the rotation of the driving roller 230. The eight support rollers 220 facing the heads 210 maintain a tensile state of the continuous sheet P when ink is discharged from the heads 210.

Capturing devices 52A and 52C are disposed at the positions corresponding to the positions of the heads 210K and 210M, to capture images of the conveyed continuous sheet P and output the captured images. The capturing device 52A and the capturing device 52C correspond to output devices.

In the present embodiment, the capturing device 52A is disposed upstream from a discharge position, at which ink is discharged from the head 210K, in the conveyance direction of the continuous sheet P. The capturing device 52C is disposed at a position corresponding to the position of the head 210M. The position corresponding to the position of the head 210M is, for example, in the vicinity of a position immediately below a position at which the head 210M discharges ink to the continuous sheet P.

Since there are four heads 210 and two capturing devices in the liquid discharge apparatus 100*b*0, the number of capturing devices is smaller than the number of heads 210. The capturing device 52A is disposed at a position corresponding to the position of the head 210K disposed most upstream among the four heads 210 in the conveyance direction 2. The position corresponding to the position of the head 210K is, for example, a position around immediately below a position where the head 210K discharges ink to the continuous sheet P.

Each of the capturing devices 52A and 52C includes an LED and an imaging element. The imaging element is a CCD or a CMOS including a plurality of pixels. Each of the capturing device 52A and the capturing device 52C irradiates the continuous sheet P with light from the LED and captures an image of a predetermined imaged area of the continuous sheet P by the imaging element. The capturing devices 52A and 52C output obtained captured images Sa and Sc to the controller 150. The predetermined imaged area corresponds to an area on the continuous sheet P that can be captured by each of the capturing devices 52A and 52C.

A base pattern made of paper fibers is included on the surface of the continuous sheet P, and the pattern of the base pattern differs depending on the position of the continuous sheet P. The capturing devices 52A and 52C capture, for example, the base pattern on the continuous sheet P. However, a capturing target of the capturing devices 52A and 52C is not limited to the base pattern and may be a mark provided in advance on the continuous sheet P or a speckle pattern generated when the continuous sheet P is irradiated with laser light.

The controller 150 controls timings of ink discharge of the heads 210K, 210Y, 210M, and 210C based on the effective image areas included in the captured image Sa and the captured image Sc. Specifically, the controller 150 detects conveyance amount errors of the continuous sheet P in the conveyance direction 2 based on the effective image area in each of the captured images Sa and Sc. The controller 150 controls the timings of ink discharge of the heads 210K, 210Y, 210M, and 210C according to the conveyance amount errors. The effective image area is a partial image area in each of the captured images Sa and Sc and is an image area used for detecting conveyance amount errors. The controller 150 can also perform conveyance control of the continuous sheet P in addition to the control of the timings of ink discharge of the heads 210K, 210Y, 210M, and 210C.

First Modification

Figure 13:
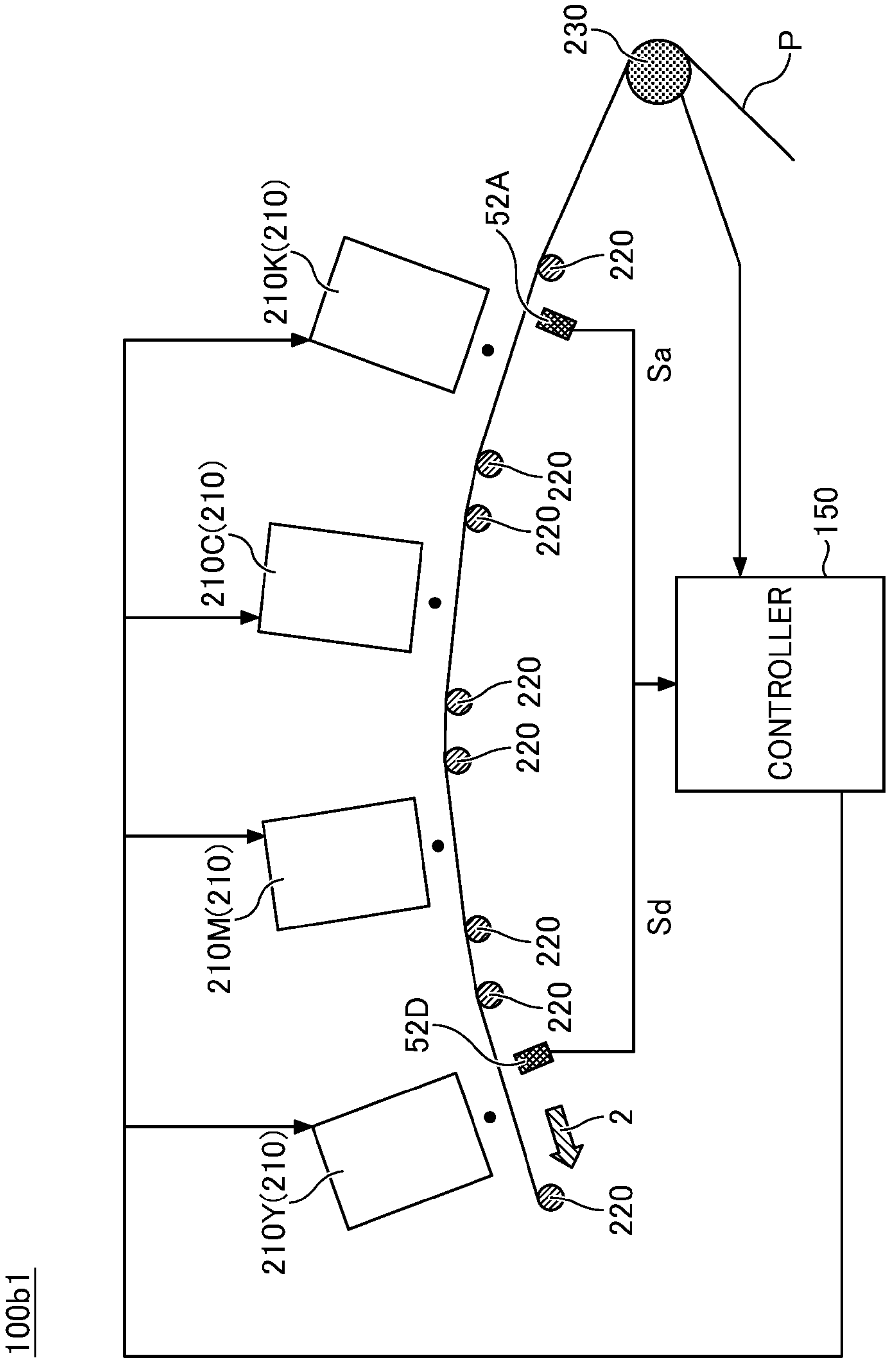
FIG. 13 is a diagram illustrating a liquid discharge apparatus according to a first modification of the third embodiment of the present disclosure.

FIG. 13 is a diagram illustrating a liquid discharge apparatus 100*b*1 according to a first modification of the third embodiment of the present disclosure. As similar to FIG. 12 described above, FIG. 13 is a diagram illustrating the heads 210K, 210Y, 210M, and 210C, and the configuration around these heads, as viewed in the width direction substantially orthogonal to a conveyance direction 2. The same applies to the liquid discharge apparatuses according to any of the modifications described below.

As illustrated in FIG. 13, a liquid discharge apparatus 100*b*1 includes a capturing device 52A disposed in the vicinity of a position immediately below the head 210K, and a capturing device 52D disposed in the vicinity of a position immediately below the head 210Y. The capturing device 52D captures an image of the continuous sheet P at a position corresponding to the head 210Y as a captured image Sd and outputs the captured image Sd.

Second Modification

Figure 14:
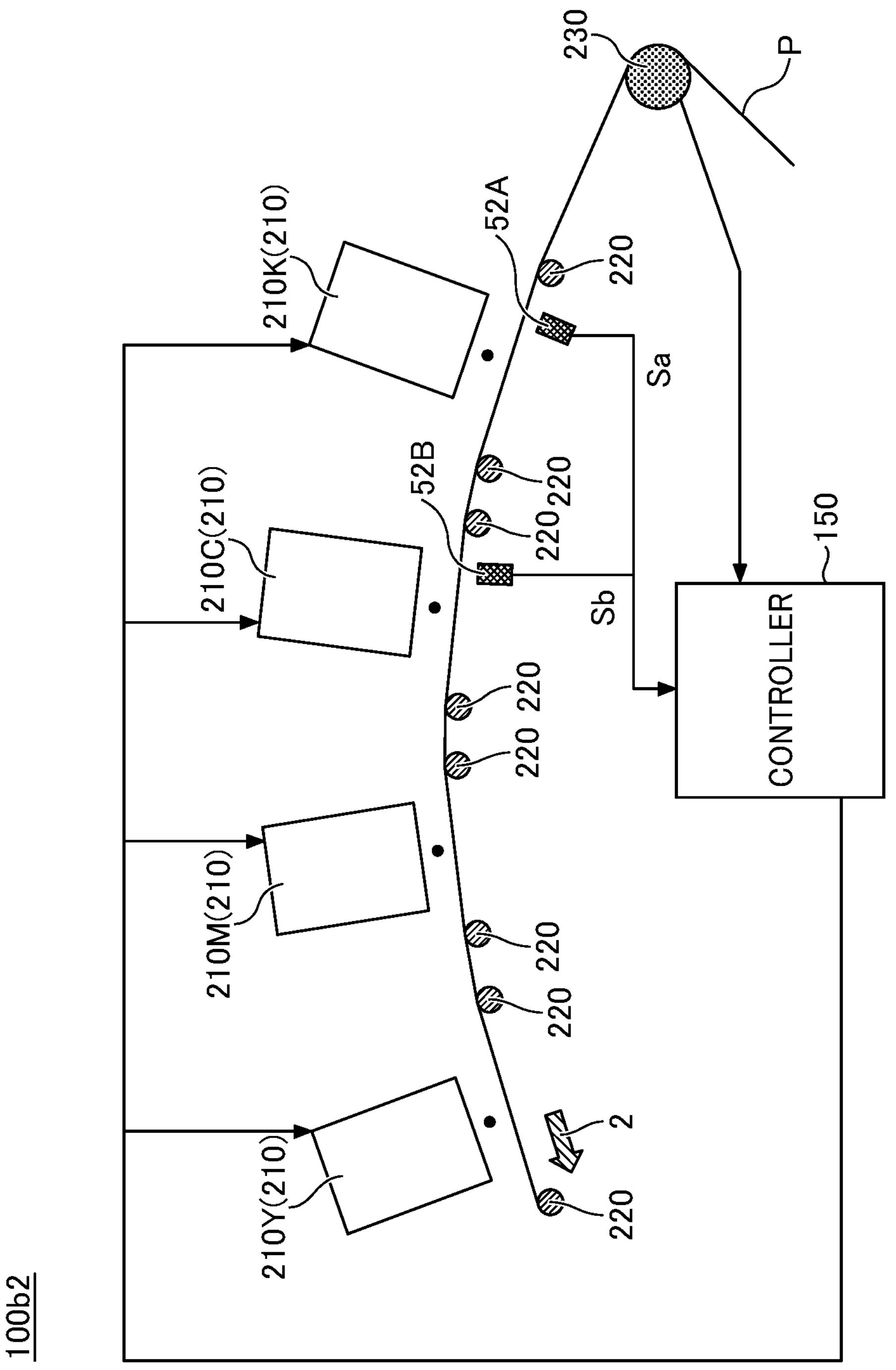
FIG. 14 is a diagram illustrating a liquid discharge apparatus according to a second modification of the third embodiment of the present disclosure.

FIG. 14 is a diagram illustrating a liquid discharge apparatus 100*b*2 according to a second modification of the third embodiment of the present disclosure. The liquid discharge apparatus 100*b*2 includes a capturing device 52A disposed in the vicinity of a position immediately below the head 210K, and a capturing device 52B disposed in the vicinity of a position immediately below the head 210C. The capturing device 52B captures an image of the continuous sheet P at a position corresponding to the head 210C as a captured image Sb and outputs the captured image Sb. The capturing device 52B and the capturing device 52D correspond to output devices. The configuration of each of the capturing device 52B and the capturing device 52D is the same as the configuration of the capturing device 52A.

Third Modification

Figure 15:
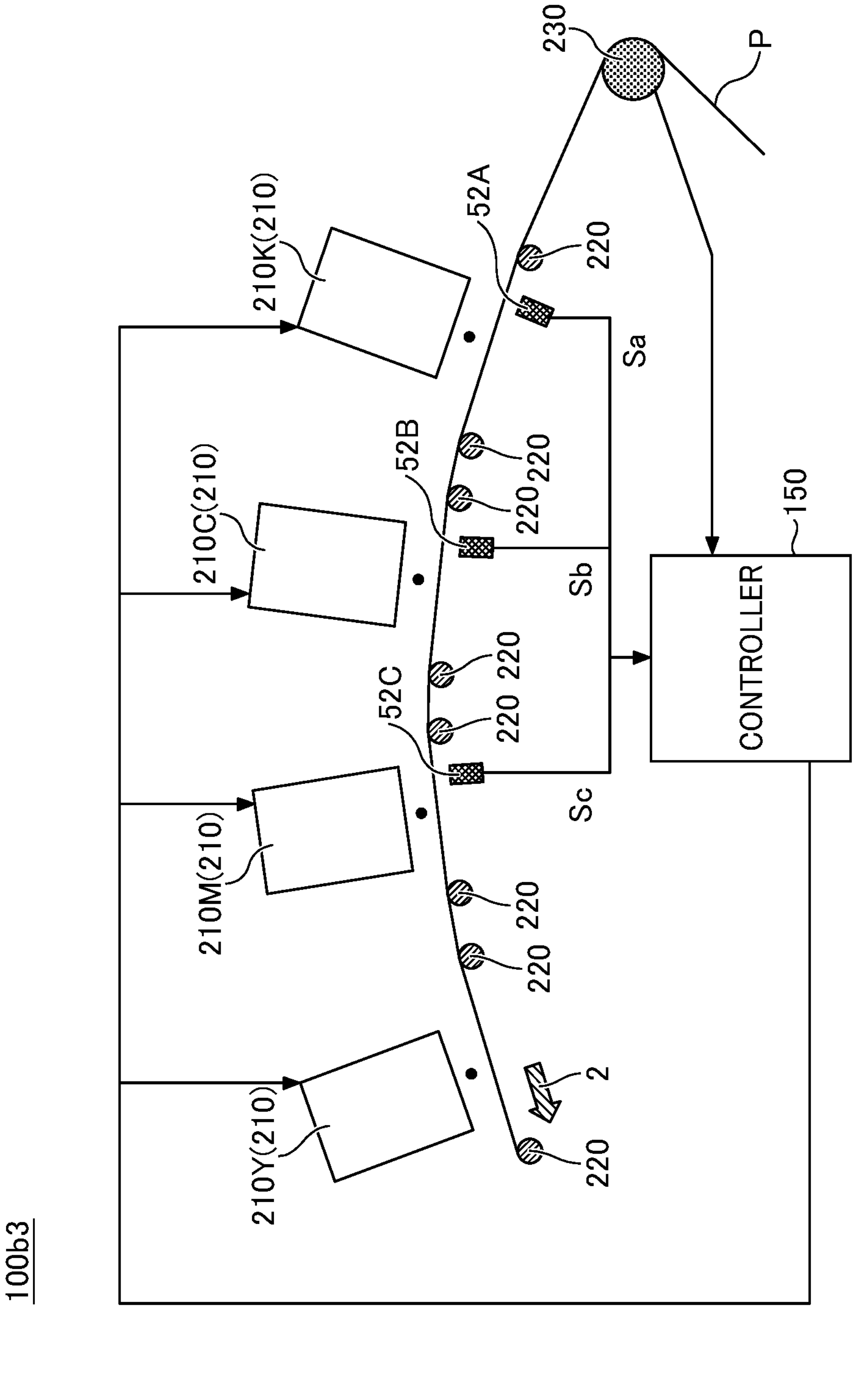
FIG. 15 is a diagram illustrating a liquid discharge apparatus according to a third modification of the third embodiment of the present disclosure.

FIG. 15 is a diagram illustrating a liquid discharge apparatus 100*b*3 according to a third modification of the third embodiment of the present disclosure. The liquid discharge apparatus 100*b*3 includes a capturing device 52A disposed in the vicinity a position immediately below the head 210K, a capturing device 52B disposed in the vicinity a position immediately below the head 210C, and a capturing device 52C disposed in the vicinity a position immediately below the head 210M. The capturing device 52B captures an image of the continuous sheet P at a position corresponding to the head 210C as a captured image Sb and outputs the captured image Sb. The capturing device 52C captures an image of the continuous sheet P at a position corresponding to the head 210M as a captured image Sc and outputs the captured image Sc.

Fourth Modification

Figure 16:
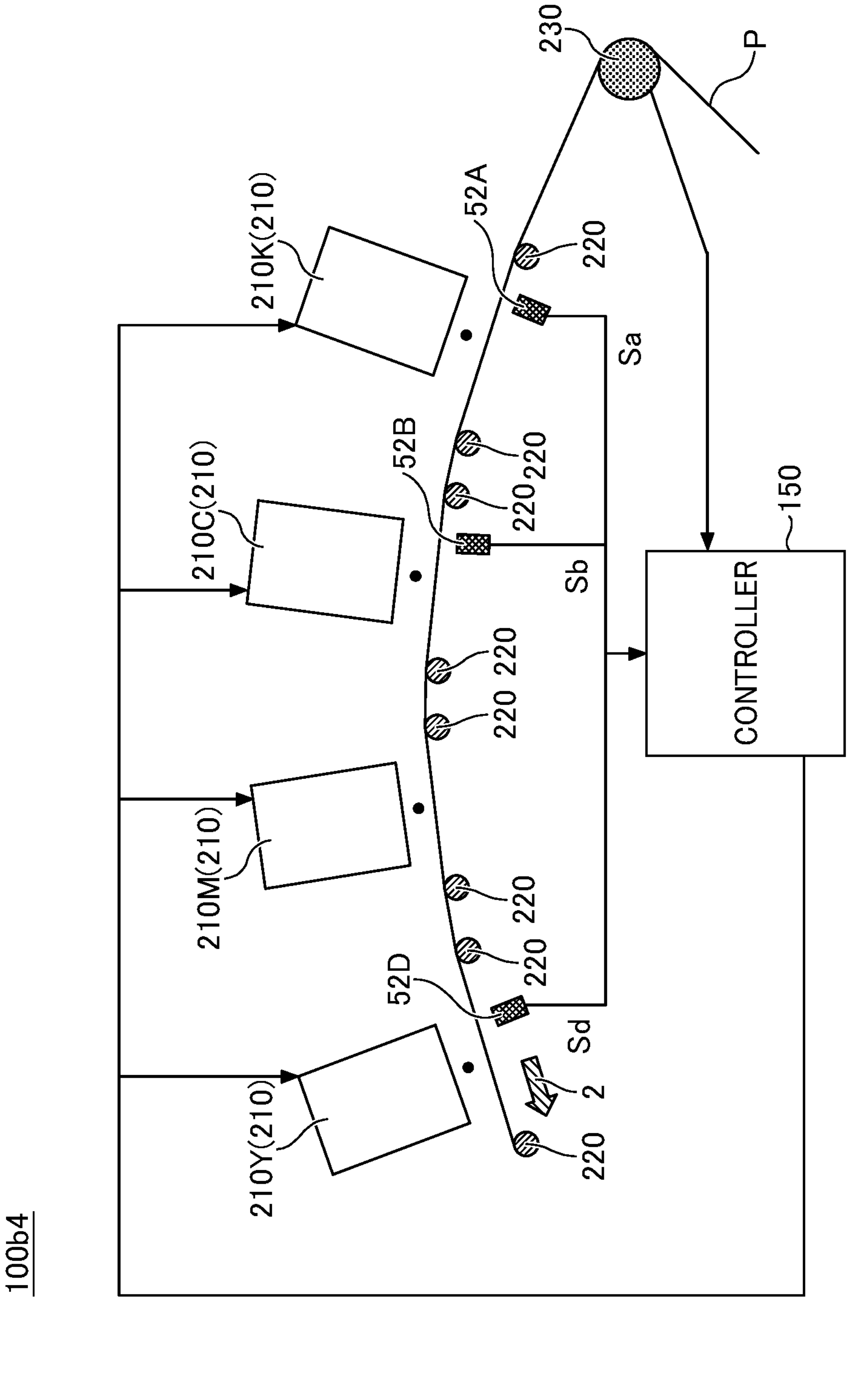
FIG. 16 is a diagram illustrating a liquid discharge apparatus according to a fourth modification of the third embodiment of the present disclosure.

FIG. 16 is a diagram illustrating a liquid discharge apparatus 100*b*4 according to a fourth modification of the third embodiment of the present disclosure. The liquid discharge apparatus 100*b*4 includes a capturing device 52A disposed in the vicinity a position immediately below the head 210K, a capturing device 52B disposed in the vicinity a position immediately below the head 210C, and a capturing device 52D disposed in the vicinity a position immediately below the head 210Y. The capturing device 52B captures an image of the continuous sheet P at a position corresponding to the head 210C as a captured image Sb and outputs the captured image Sb. The capturing device 52D captures an image of the continuous sheet P at a position corresponding to the head 210Y as a captured image Sd and outputs the captured image Sd.

Fifth Modification

Figure 17:
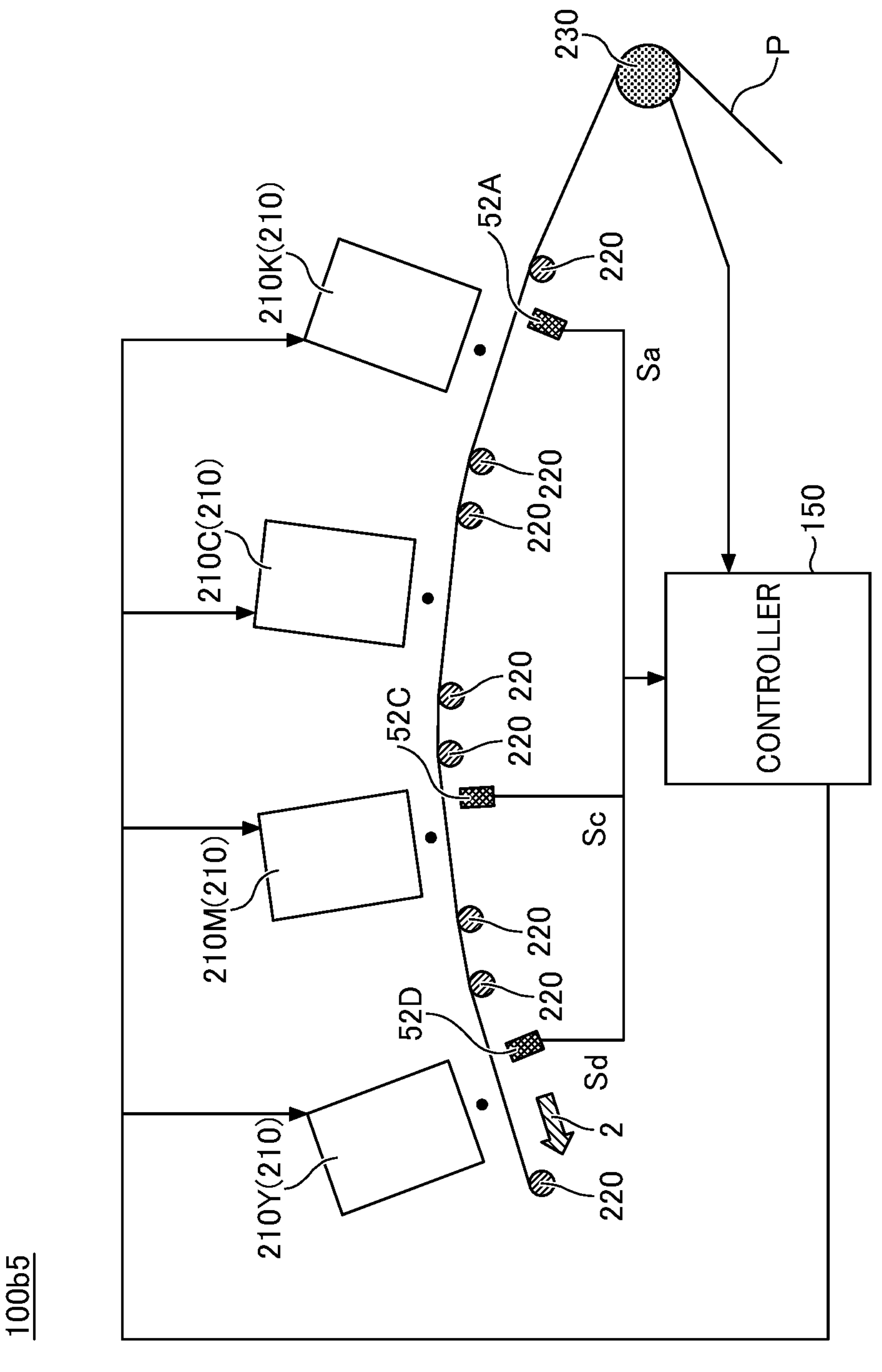
FIG. 17 is a diagram illustrating a liquid discharge apparatus according to a fifth modification of the third embodiment of the present disclosure.

FIG. 17 is a diagram illustrating a liquid discharge apparatus 100*b*5 according to a fifth modification of the third embodiment of the present disclosure. The liquid discharge apparatus 100*b*5 includes a capturing device 52A disposed in the vicinity a position immediately below the head 210K, a capturing device 52C disposed in the vicinity a position immediately below the head 210M, and a capturing device 52D disposed in the vicinity a position immediately below the head 210Y. The capturing device 52C captures an image of the continuous sheet P at a position corresponding to the head 210M as a captured image Sc and outputs the captured image Sc. The capturing device 52D captures an image of the continuous sheet P at a position corresponding to the head 210Y as a captured image Sd and outputs the captured image Sd.

Similar effects to those of the first embodiment and the second embodiment can be also obtained in the present embodiment and each of the modifications of the present embodiment. In addition, in the present embodiment and each of the modifications of the present embodiment, since output devices are disposed only at positions immediately below some of the plurality of heads, the liquid discharge apparatus can reduce the number of output devices to simplify the apparatus configuration and can reduce the apparatus cost.

Although several examples of the embodiments of the present disclosure have been described above, embodiments of the present disclosure are not limited to the above-described embodiments. In other words, various modifications and improvements can be made within the scope of the present disclosure.

Embodiments of the present disclosure include a method of discharging liquid. A liquid discharger is a liquid discharger by a liquid discharge apparatus. The liquid discharge apparatus causes a conveyor to convey an elongated web in the conveyance direction in a state in which tension is applied. The liquid discharge apparatus causes a discharger to discharge liquid to the web conveyed by the conveyor. The liquid discharge apparatus causes a first mover to move the discharger in the width direction intersecting the conveyance direction and causes an output device to output position information of the web in the width direction. The liquid discharge apparatus causes a second mover to move the output device in the width direction and causes a first control unit to control the movement by the first mover based on the output by the output device. The liquid discharge apparatus causes a second control unit to control the movement of the output device by the second mover based on information of the length of the web in the width direction and expansion-and-contraction range information of the web in the width direction and changes the position of the output device in the width direction. Such a method of discharging liquid as described above can provide operational effects equivalent to those of the above-described liquid discharge apparatus 100.

Aspects of the present disclosure are, for example, as follows.

Aspect 1

A liquid discharge apparatus includes a conveyor, a discharger, a first mover, an output device, a second mover, a first control unit, and a second control unit. The conveyor conveys an elongated web in a conveyance direction in a state in which tension is applied. The discharger discharges liquid to the web conveyed by the conveyor. The first mover moves the discharger in a width direction intersecting the conveyance direction. The output device outputs position information of the web in the width direction. The second mover moves the output device in the width direction. The first control unit controls the movement by the first mover based on the output by the output device. The second control unit controls the movement of the output device by the second mover based on information of the length of the web in the width direction and expansion-and-contraction range information of the web in the width direction and changes the position of the output device in the width direction.

Aspect 2

In the liquid discharge apparatus described in Aspect 1, the expansion-and-contraction range information of the web includes information indicating a predetermined range in the width direction on the web in which an amount of expansion and contraction of the web in the width direction is equal to or less than a predetermined threshold value. The second control unit changes the position of the output device in a manner such that the output device is disposed within the predetermined range on the web.

Aspect 3

In the liquid discharge apparatus described in Aspect 1 or 2, the output device includes a plurality of image sensors which are disposed at different positions in the conveyance direction to capture images of the web, and outputs captured images of the web captured at the different positions by the plurality of image sensors.

Aspect 4

The liquid discharge apparatus described in any one of Aspects 1 to 3 further includes a storage unit that stores correspondence information. The correspondence information is predetermined information on correspondence between information of a length of the web in the width direction and the expansion-and-contraction range information of the web in the width direction. The second control unit refers to the storage unit based on the information of the length of the web to acquire the expansion-and-contraction range information of the web. Then, the second control unit changes the position of the output device in the width direction based on the expansion-and-contraction range information of the web.

Aspect 5

A method of discharging liquid is performed by a liquid discharge apparatus. The liquid discharge apparatus causes a conveyor to convey an elongated web in the conveyance direction in a state in which tension is applied. The liquid discharge apparatus causes a discharger to discharge liquid to the web conveyed by the conveyor. The liquid discharge apparatus causes a first mover to move the discharger in the width direction intersecting the conveyance direction and causes an output device to output position information of the web in the width direction. The liquid discharge apparatus causes a second mover to move the output device in the width direction and causes a first control unit to control the movement by the first mover based on the output by the output device. The liquid discharge apparatus causes a second control unit to control the movement of the output device by the second mover based on information of the length of the web in the width direction and expansion-and-contraction range information of the web in the width direction and changes a position of the output device in the width direction.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:

1. A liquid discharge apparatus comprising:

a conveyor configured to convey an elongated web in a conveyance direction in a state in which tension is applied to the web;

a discharger configured to discharge liquid to the web conveyed by the conveyor;

a first mover configured to move the discharger in a width direction intersecting the conveyance direction;

an output device configured to output position information of the web in the width direction;

a second mover configured to move the output device in the width direction;

circuitry configured to:

control movement of the discharger by the first mover based on the position information output by the output device; and control movement of the output device by the second mover based on information of a length of the web in the width direction and expansion-and-contraction range information of the web in the width direction to change a position of the output device in the width direction.

2. The liquid discharge apparatus according to claim 1, wherein the expansion-and-contraction range information of the web includes information indicating a predetermined range in the width direction on the web in which an amount of expansion and contraction of the web in the width direction is equal to or less than a predetermined threshold value, and wherein the circuitry is configured to change the position of the output device in a manner such that the output device is disposed within the predetermined range on the web.

3. The liquid discharge apparatus according to claim 1, wherein the output device includes a plurality of image sensors that are disposed at different positions in the conveyance direction to capture images of the web, and wherein the output device is configured to output the images of the web captured at the different positions by the plurality of image sensors.

4. The liquid discharge apparatus according to claim 1, further comprising a memory configured to store correspondence information that is predetermined information on correspondence between the information of the length of the web in the width direction and the expansion-and-contraction range information of the web in the width direction, and wherein the circuitry is configured to:

refer to the memory based on the information of the length of the web to acquire the expansion-and-contraction range information of the web; and change the position of the output device in the width direction based on the expansion-and-contraction range information acquired.

* * * * *